United States Patent
Johnson et al.

(10) Patent No.: US 10,336,016 B2
(45) Date of Patent: Jul. 2, 2019

(54) EXTRUDER AND METHOD FOR PRODUCING HIGH FIBER DENSITY RESIN STRUCTURES

(75) Inventors: Aaron H. Johnson, Winona, MN (US); David W. Eastep, Winona, MN (US); Timothy L. Tibor, Winona, MN (US); Jeremy J. Maliszewski, Winona, MN (US); Tony J. Henderson, Winona, MN (US)

(73) Assignee: Ticona LLC, Florence, KY (US)

(*) Notice: Subject to any disclaimer, the term of this patent is extended or adjusted under 35 U.S.C. 154(b) by 755 days.

(21) Appl. No.: 14/234,171

(22) PCT Filed: Jul. 19, 2012

(86) PCT No.: PCT/US2012/047340
§ 371 (c)(1),
(2), (4) Date: Mar. 27, 2014

(87) PCT Pub. No.: WO2013/016121
PCT Pub. Date: Jan. 31, 2013

(65) Prior Publication Data
US 2014/0212650 A1    Jul. 31, 2014

Related U.S. Application Data

(60) Provisional application No. 61/510,682, filed on Jul. 22, 2011, provisional application No. 61/660,208, filed on Jun. 15, 2012.

(51) Int. Cl.
| | | |
|---|---|---|
| *B29C 70/52* | (2006.01) | |
| *B29B 17/00* | (2006.01) | |
| *B29B 15/12* | (2006.01) | |

(52) U.S. Cl.
CPC .......... *B29C 70/523* (2013.01); *B29B 15/122* (2013.01); *B29B 17/0005* (2013.01);
(Continued)

(58) Field of Classification Search
CPC ... B27N 1/02; C08K 7/02; C08K 3/04; C08K 3/40; B29C 70/06; B29C 70/523;
(Continued)

(56) References Cited

U.S. PATENT DOCUMENTS

| | | |
|---|---|---|
| 1,078,448 A | 11/1913 | Marcroft |
| 1,111,500 A | 9/1914 | Schautz et al. |

(Continued)

FOREIGN PATENT DOCUMENTS

| | | |
|---|---|---|
| DE | 19827524 A1 | 12/1999 |
| EP | 0320653 A2 | 11/1988 |

(Continued)

OTHER PUBLICATIONS

"Tape". 2011. In the American Heritage Dictionary of the English Language, edited by the Editors of the American Heritage Dictionaries and TheEditorsoftheAmericanHeritageDictionaries. Boston: Houghton Mifflin. http://search.credoreference.com/content/entry/hmdictenglang/tape/0.*

(Continued)

*Primary Examiner* — Camie S Thompson
(74) *Attorney, Agent, or Firm* — Dority & Manning, P.A.

(57) ABSTRACT

An extruder (1) and a method for producing high-fiber volume reinforced thermoplastic resin structures (50), as well as a tape (156) having opposing resin rich portions (302) and a fiber rich portion (304) disposed therebetween and a method for impregnating at least one fiber roving (142) with a polymer resin to form a tape (156. The extruder (1) includes an impregnation die (3) having a channel (4) that applies pressurized molten thermoplastic resin to a plurality of rovings (142) drawn through the channel (4), and a die (3) faceplate (5) facing the downstream side (34) of said die (3). The faceplate (5) has a plurality of sizing holes (42) or a slot (75) arranged along a line that the resin-impregnated rovings (142) are simultaneously drawn through that remove excess resin and pultrude the resin-impregnated rovings (142) into (Continued)

rod-shaped or sheet-shaped structures. The faceplate (5) is spaced apart from the downstream side (34) of the die (4) to provide a gap (6) between the die (4) and a back side of the faceplate (5).

18 Claims, 22 Drawing Sheets

(52) U.S. Cl.
CPC ............ *B29C 70/525* (2013.01); *Y02W 30/62* (2015.05); *Y10T 428/249948* (2015.04)

(58) Field of Classification Search
CPC .......... B29C 70/525; B29C 70/86; C08J 5/04; C08J 5/042; C08J 5/08; Y10T 428/1352; Y10T 428/249948; Y10T 428/24994; Y10T 428/249946; Y10T 428/249947; Y10T 428/2967
USPC ...... 264/171.13, 555; 428/394, 299.1, 299.4, 428/299.7, 395; 425/505
See application file for complete search history.

(56) References Cited

U.S. PATENT DOCUMENTS

| | | | |
|---|---|---|---|
| 1,898,085 A | 2/1933 | Dreyfus et al. | |
| 3,647,526 A | 3/1972 | Barnes | |
| 3,803,965 A | 4/1974 | Alderfer | |
| 3,934,064 A | 1/1976 | Lowthian | |
| 4,330,494 A | 5/1982 | Iwata et al. | |
| 4,531,959 A | 7/1985 | Gitimoy et al. | |
| 4,588,538 A | 5/1986 | Chung et al. | |
| 4,643,126 A | 2/1987 | Wilkinson et al. | |
| 4,720,366 A | 1/1988 | Binnersley et al. | |
| 4,721,637 A | 1/1988 | Suzuki | |
| 4,728,387 A | 3/1988 | Hilakos | |
| RE32,772 E | 10/1988 | Hawley | |
| 4,792,481 A | 12/1988 | O'Connor et al. | |
| 4,864,964 A | 9/1989 | Hilakos | |
| 4,883,625 A | 11/1989 | Glemet et al. | |
| 4,923,134 A | 5/1990 | Kinnan | |
| 4,957,422 A | 9/1990 | Glemet et al. | |
| 4,983,247 A | 1/1991 | Kim | |
| 4,997,703 A | 3/1991 | Gehrig | |
| 5,002,712 A | 3/1991 | Goldmann et al. | |
| 5,068,142 A * | 11/1991 | Nose ...................... | B29C 70/20 264/176.1 |
| 5,084,305 A | 1/1992 | Marttila | |
| 5,114,516 A | 5/1992 | Pilling et al. | |
| 5,114,633 A | 5/1992 | Stewart | |
| 5,116,450 A | 5/1992 | Spoo et al. | |
| 5,207,850 A | 5/1993 | Parekh | |
| 5,268,050 A * | 12/1993 | Azari ...................... | B29B 9/06 118/420 |
| 5,277,566 A | 1/1994 | Augustin et al. | |
| 5,294,461 A | 3/1994 | Ishida | |
| 5,419,957 A | 5/1995 | Martin | |
| 5,529,652 A | 6/1996 | Asai et al. | |
| 5,783,129 A | 7/1998 | Shirai et al. | |
| 5,798,068 A | 8/1998 | Vlug | |
| 5,799,705 A | 9/1998 | Friedrich | |
| 5,863,332 A | 1/1999 | Foster et al. | |
| 5,895,808 A | 4/1999 | Schmid et al. | |
| 5,935,508 A | 8/1999 | Fernyhough et al. | |
| 5,948,473 A | 9/1999 | Saito et al. | |
| 6,045,876 A | 4/2000 | Fellers et al. | |
| 6,048,598 A | 4/2000 | Bryan, III et al. | |
| 6,090,319 A | 7/2000 | Sharma et al. | |
| 6,117,591 A | 9/2000 | Takeuchi et al. | |
| 6,244,014 B1 | 6/2001 | Barmakian | |
| 6,248,262 B1 | 6/2001 | Kubotera et al. | |
| 6,258,453 B1 | 7/2001 | Montsinger | |
| 6,260,343 B1 | 7/2001 | Pourladian | |
| 6,270,851 B1 | 8/2001 | Lee et al. | |
| 6,286,558 B1 | 9/2001 | Quigley | |
| 6,329,056 B1 | 12/2001 | Deve et al. | |
| 6,334,293 B1 | 1/2002 | Poethke et al. | |
| 6,344,270 B1 | 2/2002 | McCullough et al. | |
| 6,346,325 B1 | 2/2002 | Edwards et al. | |
| 6,391,959 B1 | 5/2002 | Ninomiya et al. | |
| 6,455,143 B1 | 9/2002 | Ishibashi et al. | |
| 6,517,654 B1 | 2/2003 | Heckel et al. | |
| 6,656,316 B1 | 12/2003 | Dyksterhouse | |
| 6,658,836 B2 | 12/2003 | Nguyen et al. | |
| 6,688,338 B2 | 2/2004 | Meli | |
| 6,846,857 B1 | 1/2005 | Lindner | |
| 6,872,343 B2 | 3/2005 | Edwards et al. | |
| 7,015,395 B2 | 3/2006 | Goldsworthy et al. | |
| 7,059,091 B2 | 6/2006 | Paulshus et al. | |
| 7,060,326 B2 | 6/2006 | Hiel et al. | |
| 7,093,416 B2 | 8/2006 | Johnson et al. | |
| 7,131,308 B2 | 11/2006 | McCullough et al. | |
| 7,179,522 B2 | 2/2007 | Hiel et al. | |
| 7,211,319 B2 | 5/2007 | Hiel et al. | |
| 7,220,492 B2 | 5/2007 | Fick et al. | |
| 7,291,263 B2 | 11/2007 | Ward et al. | |
| 7,326,854 B2 | 2/2008 | Varkey | |
| 7,368,162 B2 | 5/2008 | Hiel et al. | |
| 7,402,753 B2 | 7/2008 | Varkey et al. | |
| 7,438,971 B2 | 10/2008 | Bryant et al. | |
| 7,650,742 B2 | 1/2010 | Ushijima | |
| 7,705,242 B2 | 4/2010 | Winterhalter | |
| 7,754,966 B2 | 7/2010 | Figenschou | |
| 9,238,347 B2 | 1/2016 | Nelson et al. | |
| 9,394,530 B2 | 7/2016 | Erlandsen et al. | |
| 2001/0010248 A1 | 8/2001 | Vodermayer et al. | |
| 2002/0019182 A1 | 2/2002 | Ishibashi et al. | |
| 2002/0041049 A1 | 4/2002 | McCullough | |
| 2002/0125603 A1 | 9/2002 | Sakai et al. | |
| 2003/0037529 A1 | 2/2003 | Hanna et al. | |
| 2003/0082380 A1 | 5/2003 | Hager et al. | |
| 2003/0157280 A1 | 8/2003 | Boissonnat et al. | |
| 2004/0098963 A1 | 5/2004 | Calleeuw et al. | |
| 2004/0115422 A1 | 6/2004 | Levit et al. | |
| 2004/0182597 A1 | 9/2004 | Smith et al. | |
| 2004/0224590 A1 | 11/2004 | Rawa et al. | |
| 2004/0265558 A1 | 12/2004 | Berard | |
| 2005/0181228 A1 | 8/2005 | McCullough et al. | |
| 2005/0186410 A1 | 8/2005 | Bryant et al. | |
| 2005/0244231 A1 | 11/2005 | Liao et al. | |
| 2006/0021729 A1 | 2/2006 | Werner et al. | |
| 2006/0024489 A1 | 2/2006 | Werner et al. | |
| 2006/0024490 A1 | 2/2006 | Werner et al. | |
| 2006/0049541 A1 | 3/2006 | Sutton et al. | |
| 2006/0204739 A1 | 9/2006 | Papke et al. | |
| 2007/0128435 A1 | 6/2007 | Hiel et al. | |
| 2007/0193767 A1 | 8/2007 | Guery et al. | |
| 2007/0202331 A1 | 8/2007 | Davis et al. | |
| 2007/0269645 A1 | 11/2007 | Raghavendran et al. | |
| 2007/0271897 A1 | 11/2007 | Hanna et al. | |
| 2008/0006337 A1 | 1/2008 | Quigley et al. | |
| 2008/0141614 A1 | 6/2008 | Knouff et al. | |
| 2008/0166511 A1 * | 7/2008 | Honma ................... | C08G 59/50 428/36.4 |
| 2008/0250631 A1 | 10/2008 | Buckley | |
| 2008/0282664 A1 | 11/2008 | Chou et al. | |
| 2008/0282666 A1 | 11/2008 | Chou | |
| 2009/0229452 A1 | 9/2009 | Milwich et al. | |
| 2010/0021718 A1 | 1/2010 | Vos et al. | |
| 2010/0028593 A1 * | 2/2010 | Taketa .................. | B29C 43/222 428/113 |
| 2010/0038112 A1 | 2/2010 | Grether | |
| 2010/0092770 A1 * | 4/2010 | Wadahara ............. | B29C 43/003 428/339 |
| 2010/0163275 A1 | 7/2010 | Hiel et al. | |
| 2010/0181012 A1 | 7/2010 | Hiel et al. | |
| 2010/0206606 A1 | 8/2010 | Winterhalter | |
| 2010/0263761 A1 | 10/2010 | Nicolls | |
| 2011/0097575 A1 | 4/2011 | Pratte et al. | |
| 2011/0284117 A1 | 11/2011 | Ansell | |
| 2012/0273988 A1 | 11/2012 | Eastep et al. | |
| 2012/0321804 A1 | 12/2012 | Regan et al. | |

(56) References Cited

U.S. PATENT DOCUMENTS

| | | | |
|---|---|---|---|
| 2013/0145986 A1 | 6/2013 | Regan | |
| 2013/0147082 A1 | 6/2013 | Johnson et al. | |
| 2013/0147083 A1 | 6/2013 | Eastep et al. | |
| 2013/0147084 A1 | 6/2013 | Johnson et al. | |
| 2013/0333780 A1 | 12/2013 | Chan | |
| 2014/0212650 A1 | 7/2014 | Johnson et al. | |

FOREIGN PATENT DOCUMENTS

| | | | |
|---|---|---|---|
| EP | 0383290 A1 | 8/1990 | |
| EP | 0415517 A1 | 3/1991 | |
| EP | 0520347 A1 | 12/1992 | |
| EP | 0707939 A2 | 4/1996 | |
| EP | 0712716 A1 | 5/1996 | |
| EP | 1291332 A2 | 3/2003 | |
| EP | 1775092 A1 | 4/2007 | |
| EP | 1790448 A1 | 5/2007 | |
| FR | 2 836 591 A1 | 8/2003 | |
| GB | 2240997 A | 8/1991 | |
| JP | 58-138616 A | 8/1983 | |
| JP | 03-119188 A | 5/1991 | |
| JP | 05-033278 A | 7/1991 | |
| JP | 05-148780 A | 11/1991 | |
| JP | 05-050432 A | 3/1993 | |
| JP | 06-071724 A | 3/1994 | |
| JP | 07-279940 A | 10/1995 | |
| JP | 11-348140 A | 12/1999 | |
| JP | 2001-300935 A | 10/2001 | |
| JP | 2004-300609 A | 10/2004 | |
| WO | WO 99/57413 A1 | 11/1999 | |
| WO | WO 2004/026565 A1 | 4/2004 | |
| WO | WO 2004/080698 A1 | 9/2004 | |
| WO | WO 2008/075964 A1 | 6/2008 | |
| WO | WO 2009/130525 A1 | 10/2009 | |
| WO | WO 2011/163349 A2 | 12/2011 | |
| WO | WO 2011/163357 A2 | 12/2011 | |
| WO | WO 2011/163365 A2 | 12/2011 | |
| WO | WO 2012/072993 A2 | 6/2012 | |
| WO | WO 2012/149127 A1 | 11/2012 | |

* cited by examiner

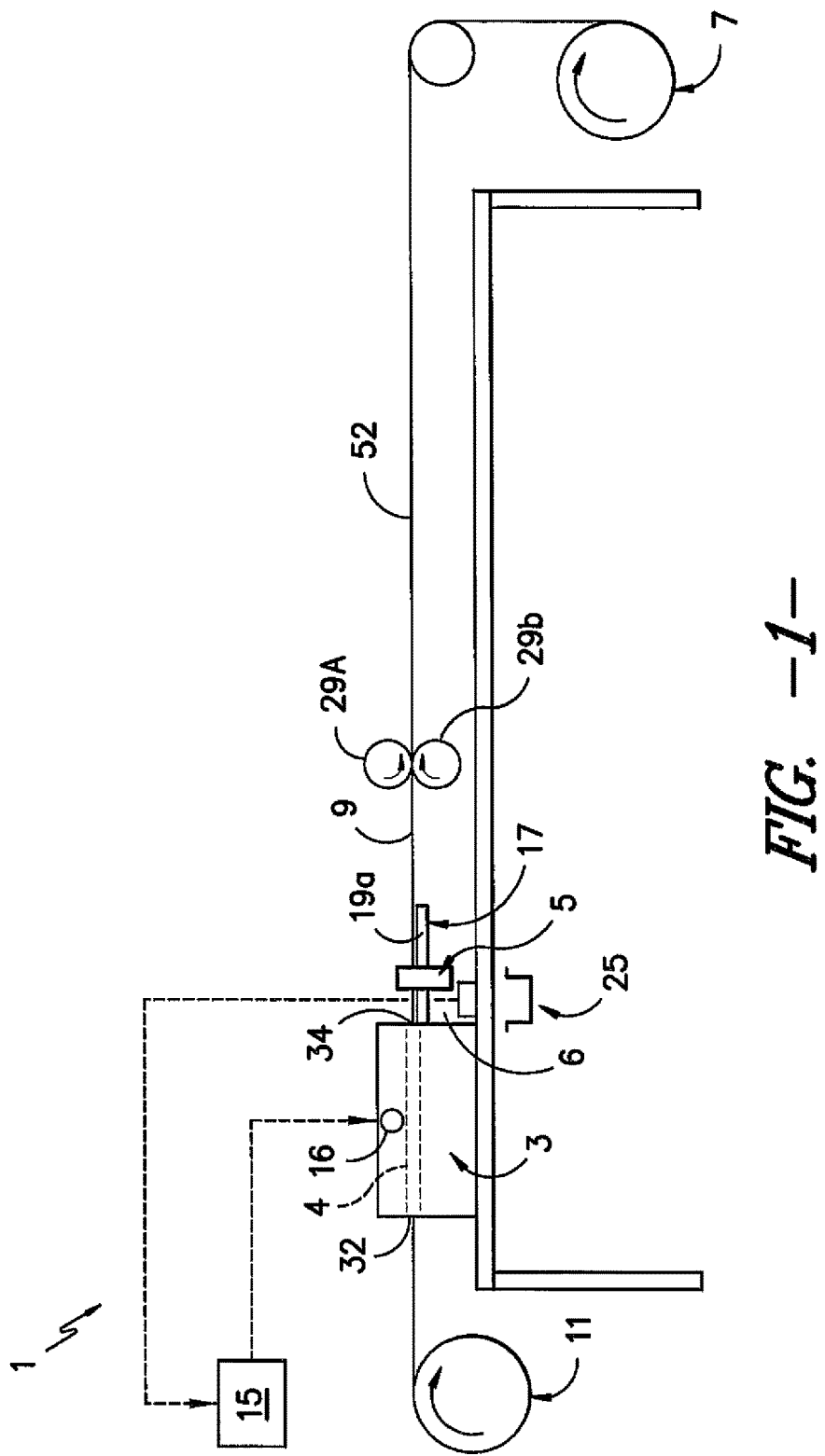
FIG. -1-

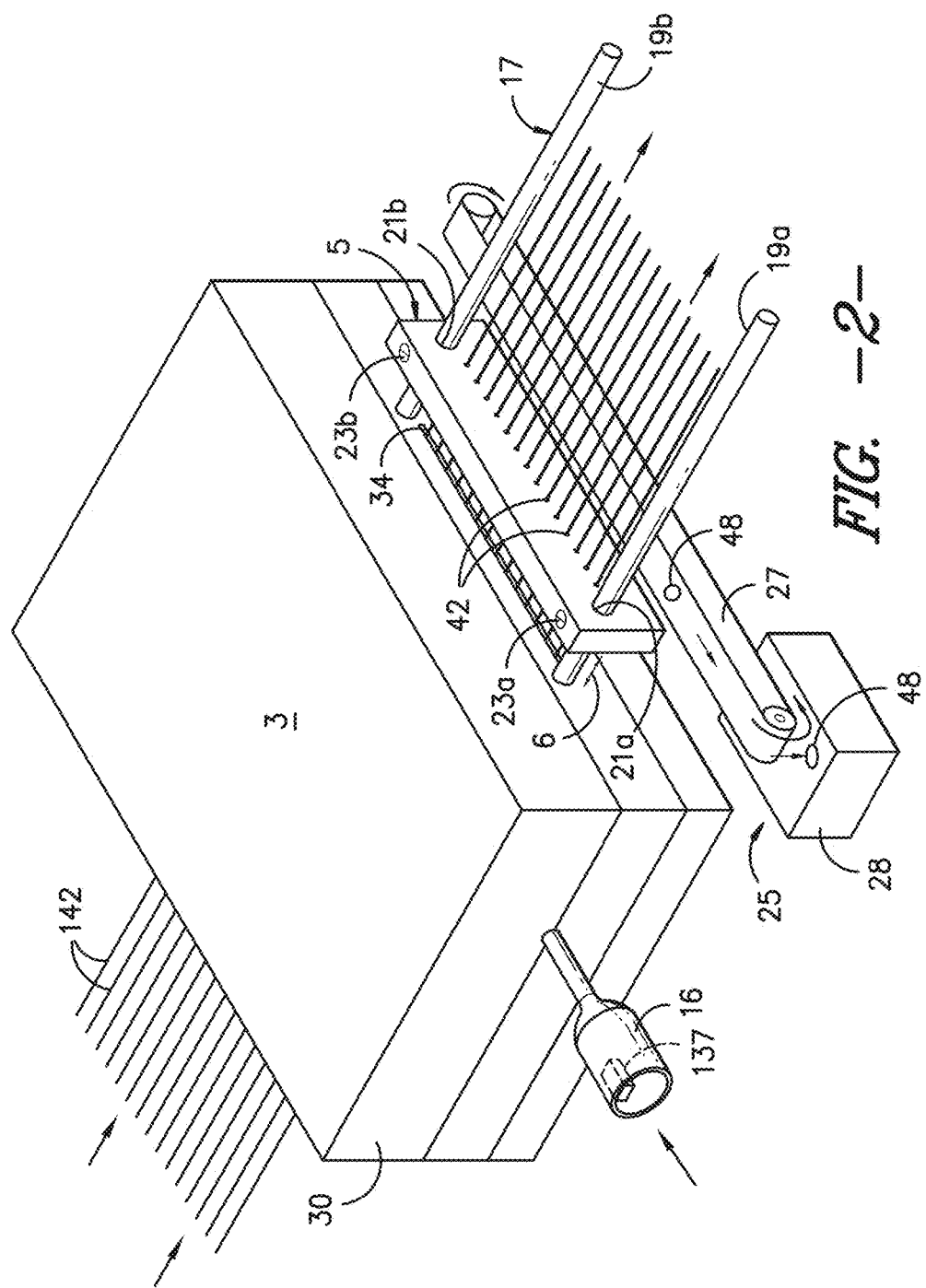

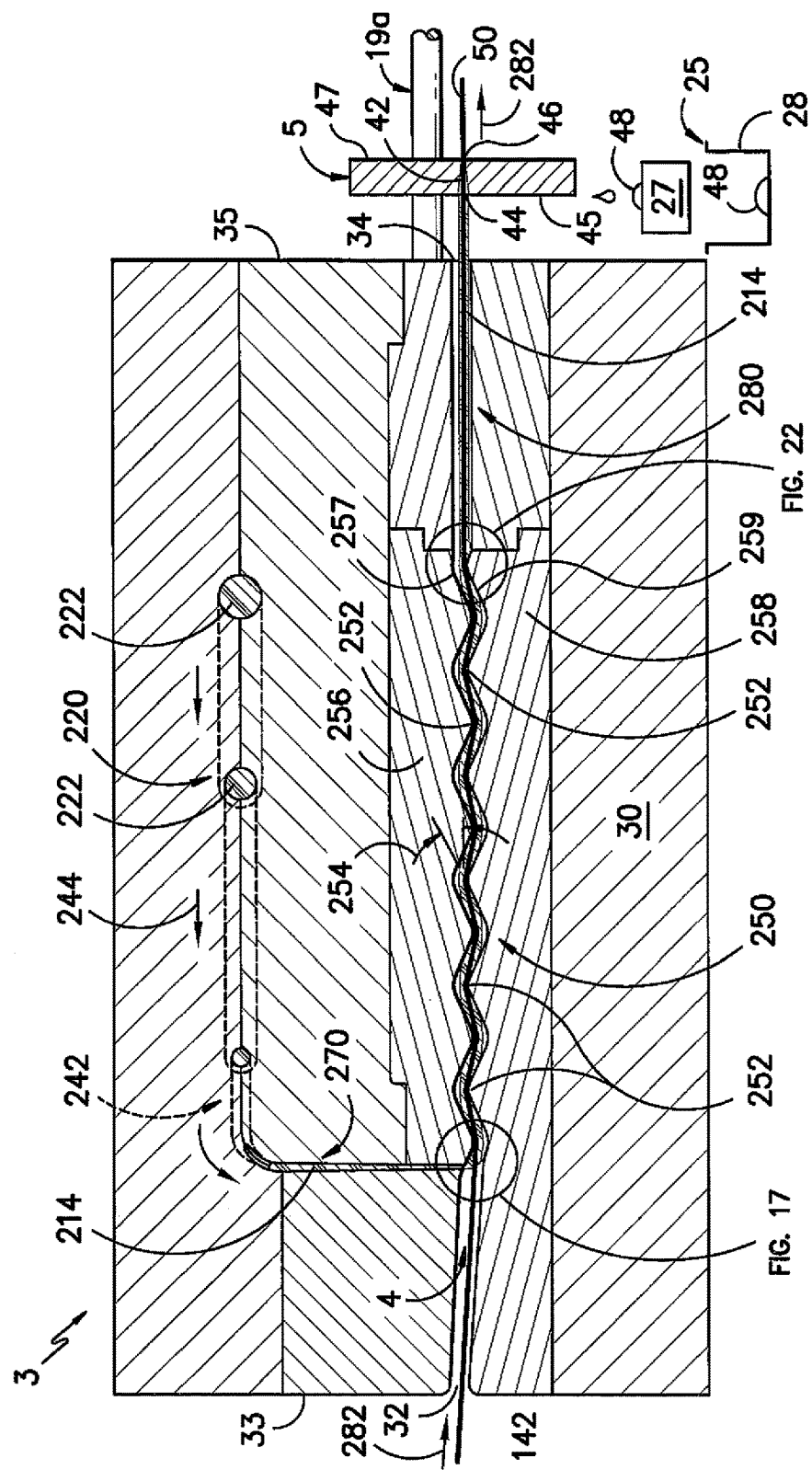

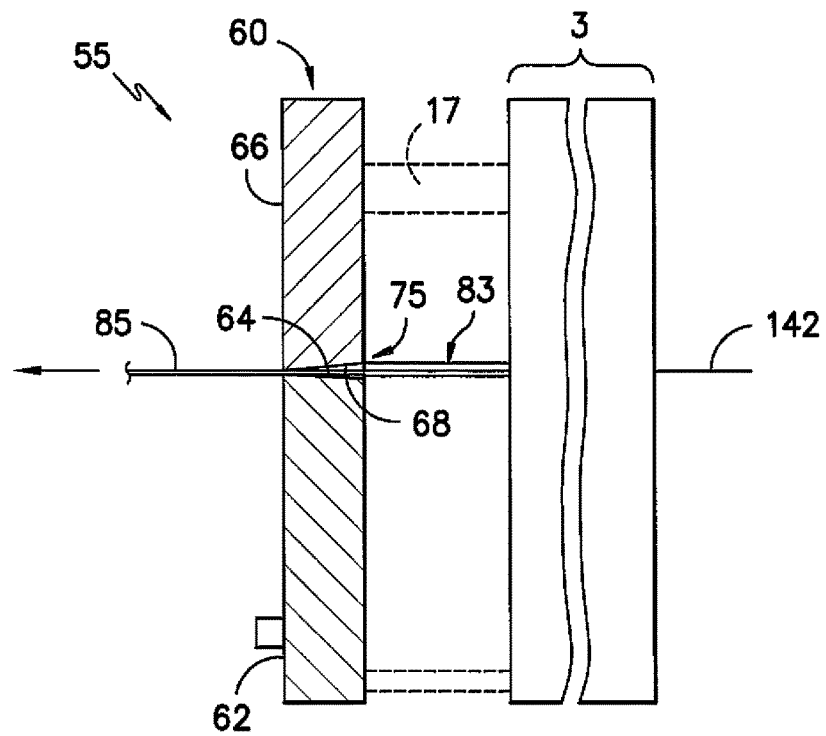
FIG. -4A-
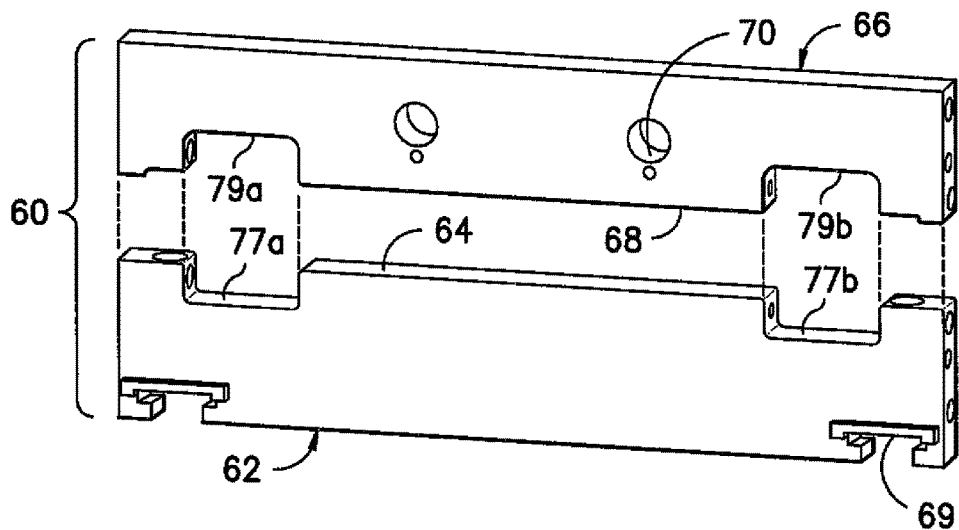
FIG. -4B-

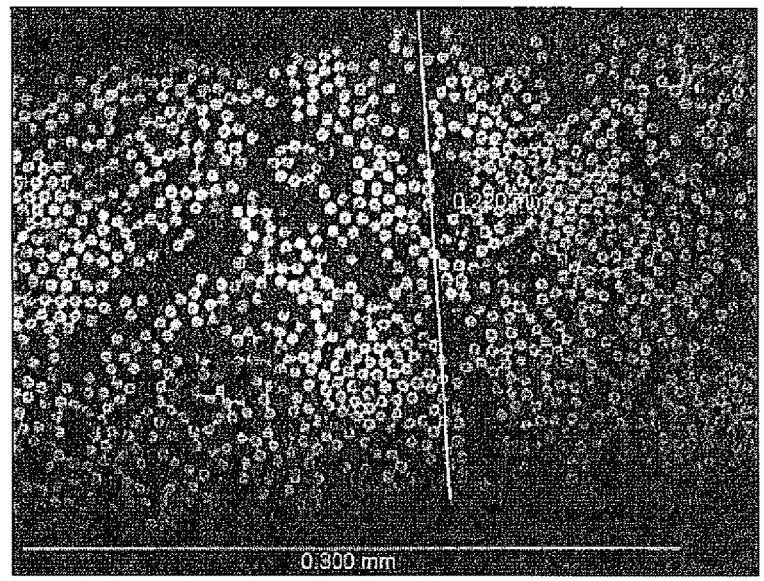
FIG. -5A-
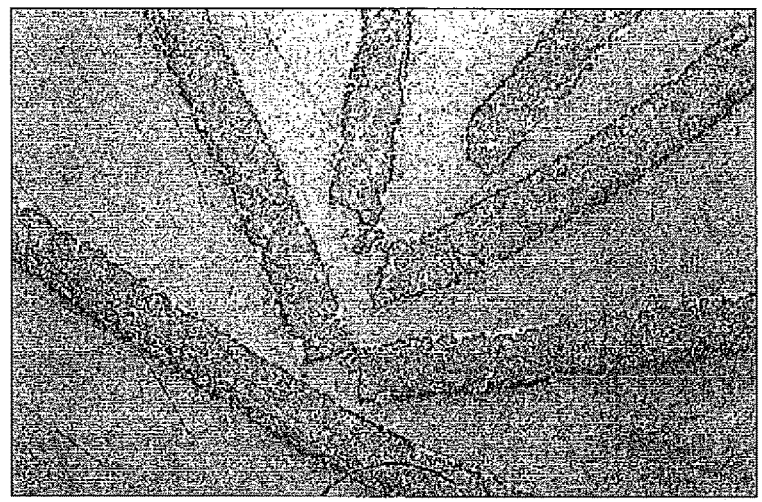
FIG. -5B-

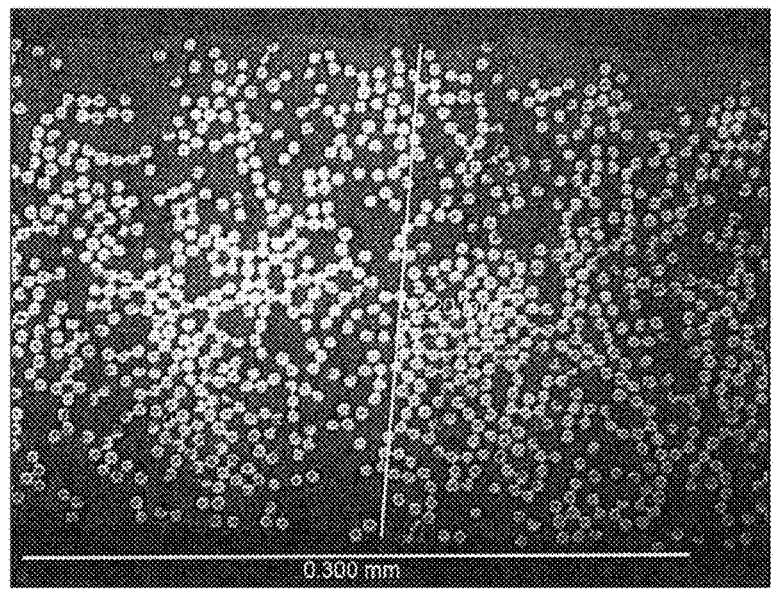
FIG. —6A—
PRIOR ART
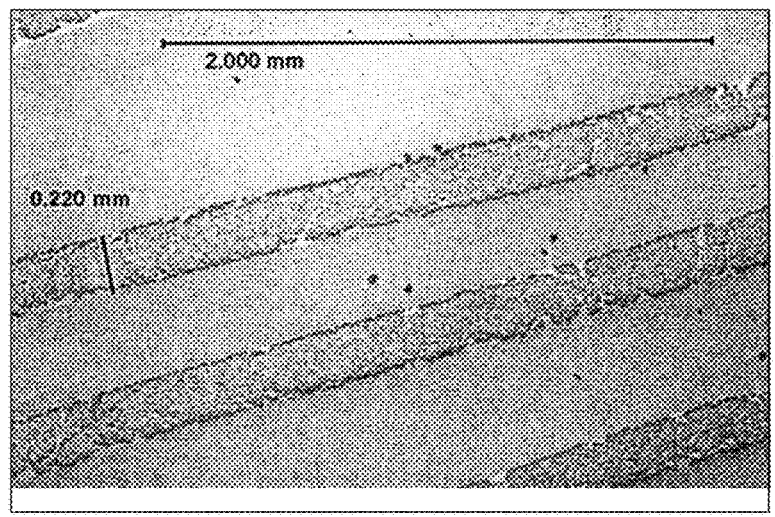
FIG. —6B—
PRIOR ART

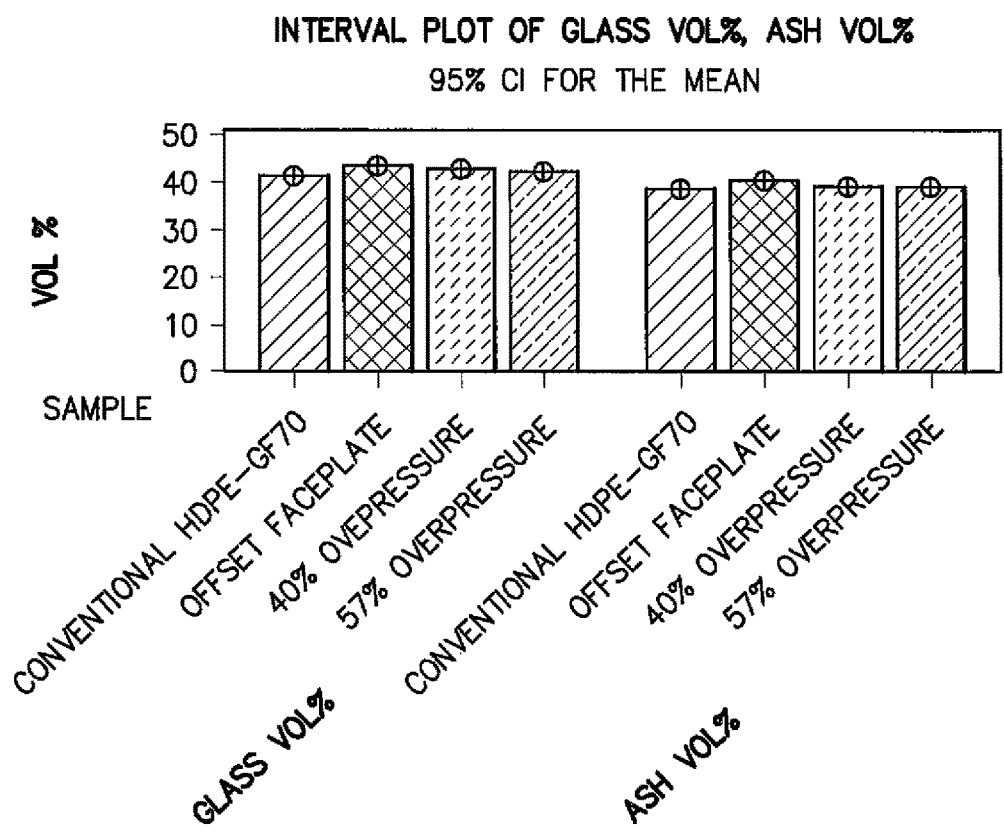
FIG. -7-

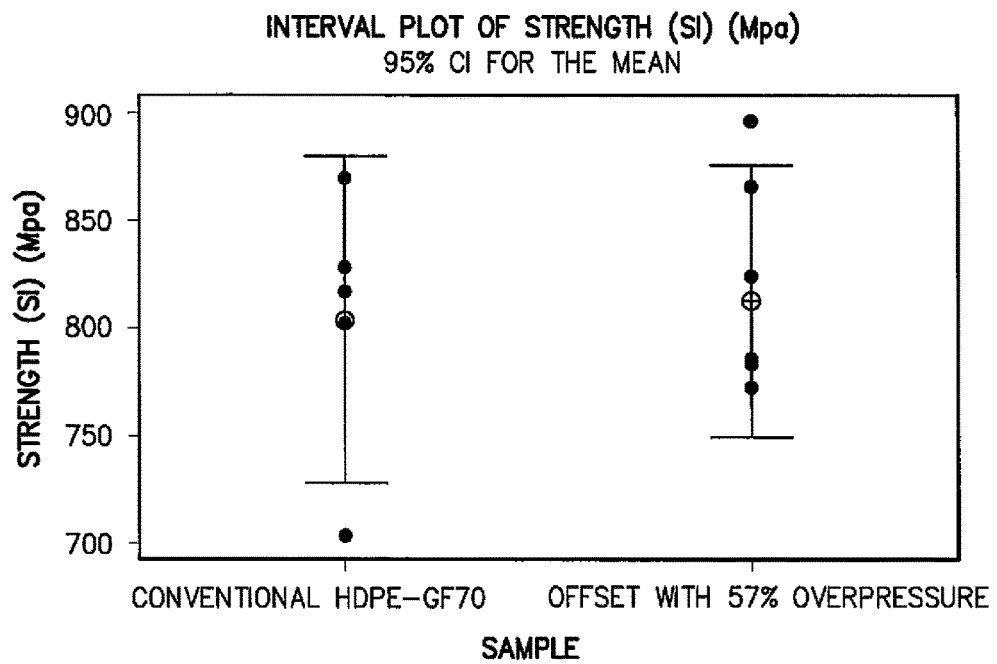
FIG. -8A-
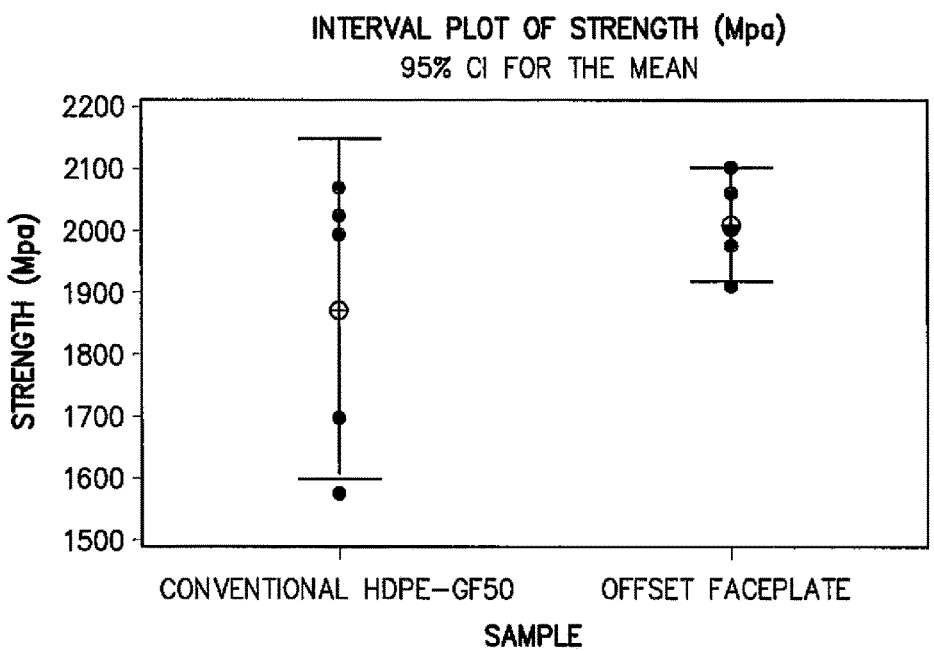
FIG. -8B-

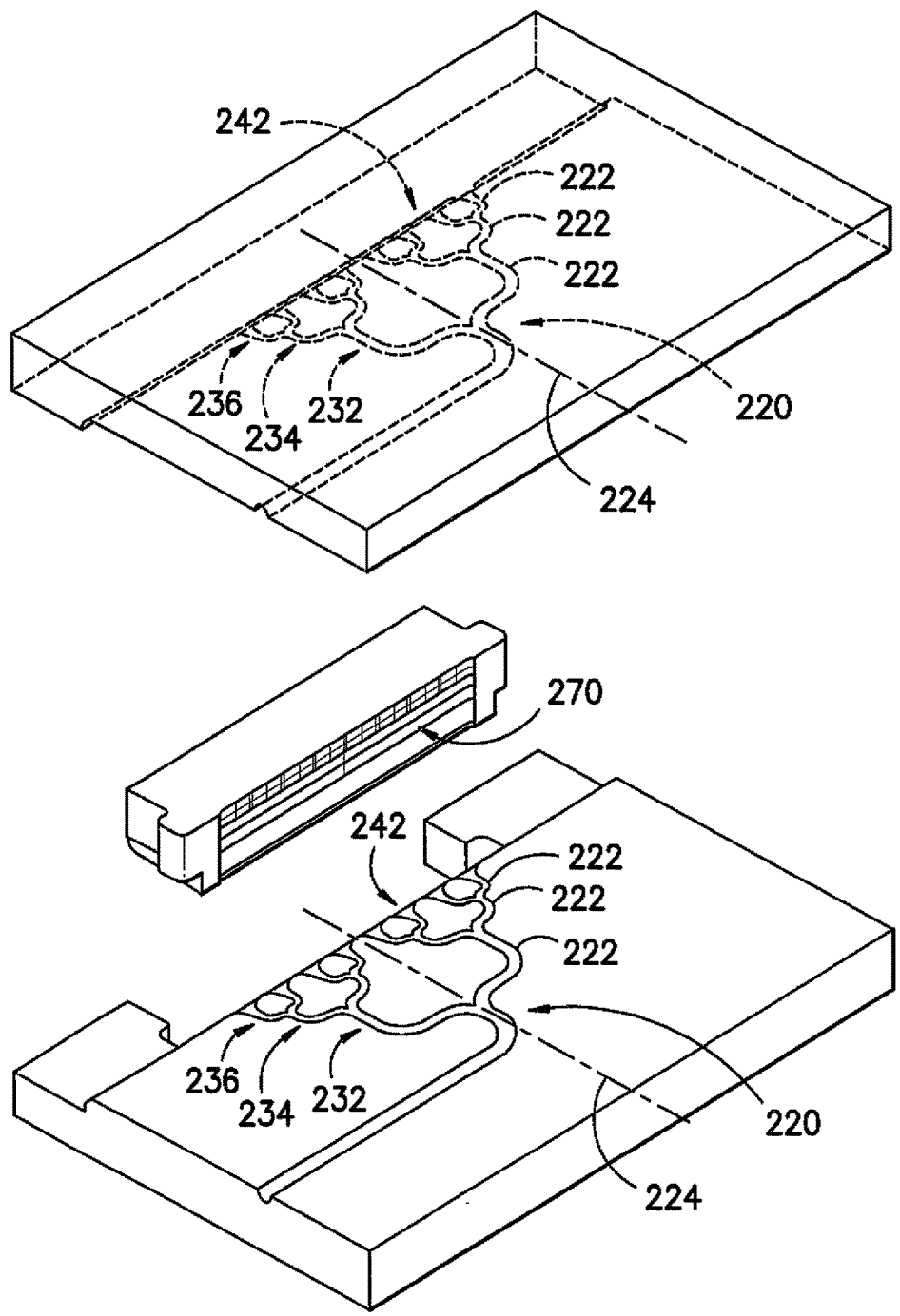
FIG. −9−

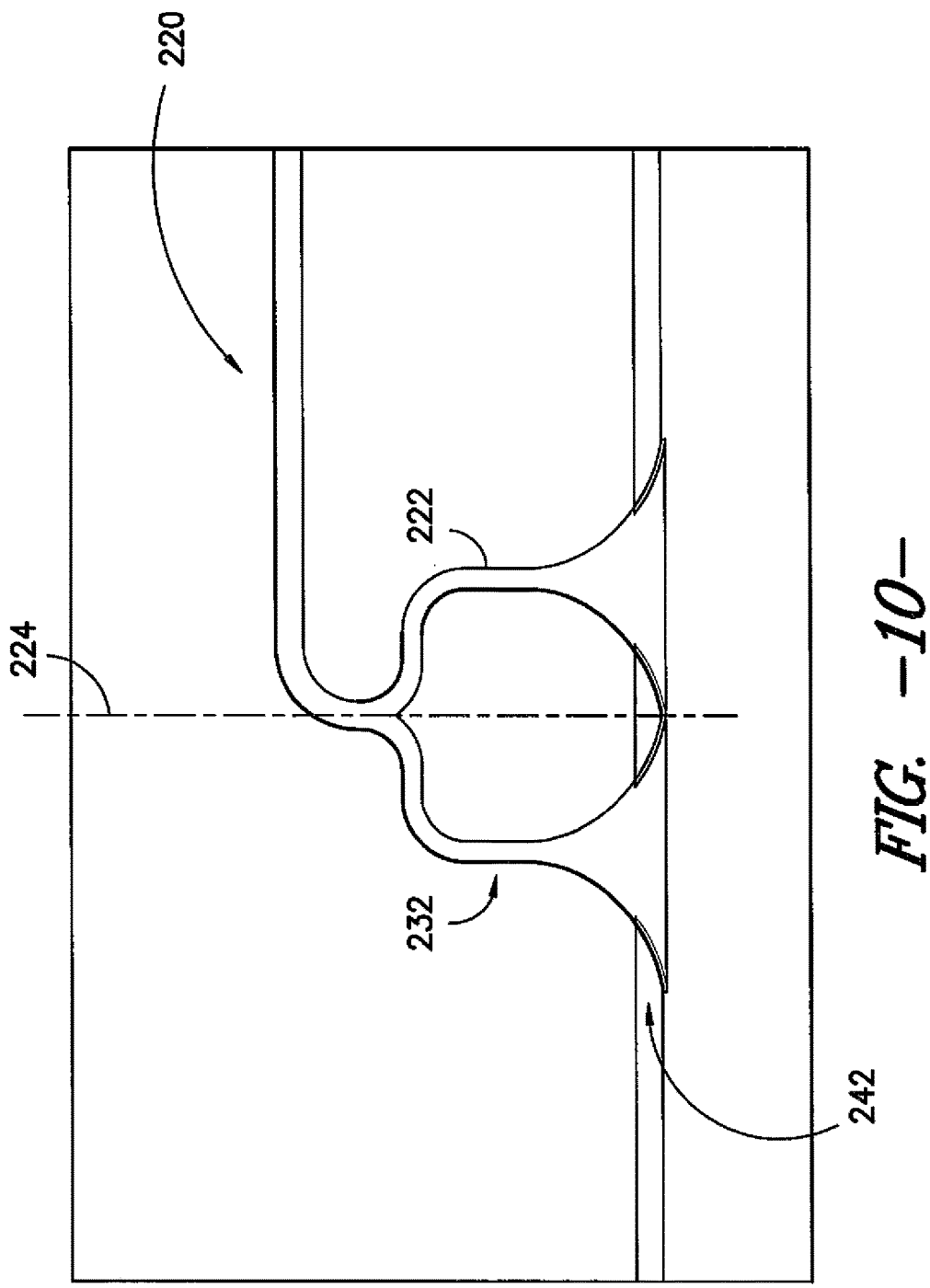
FIG. -10-

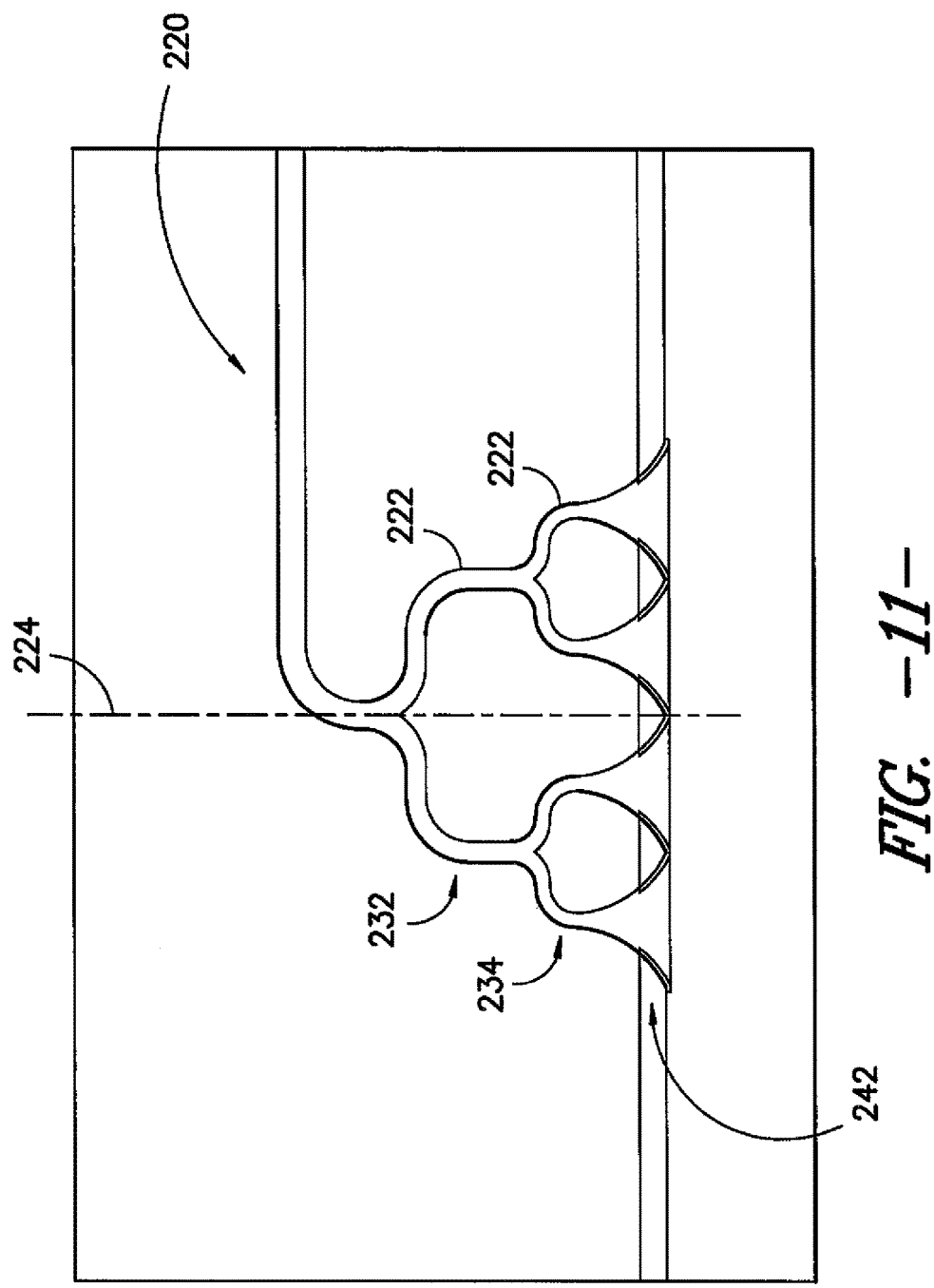

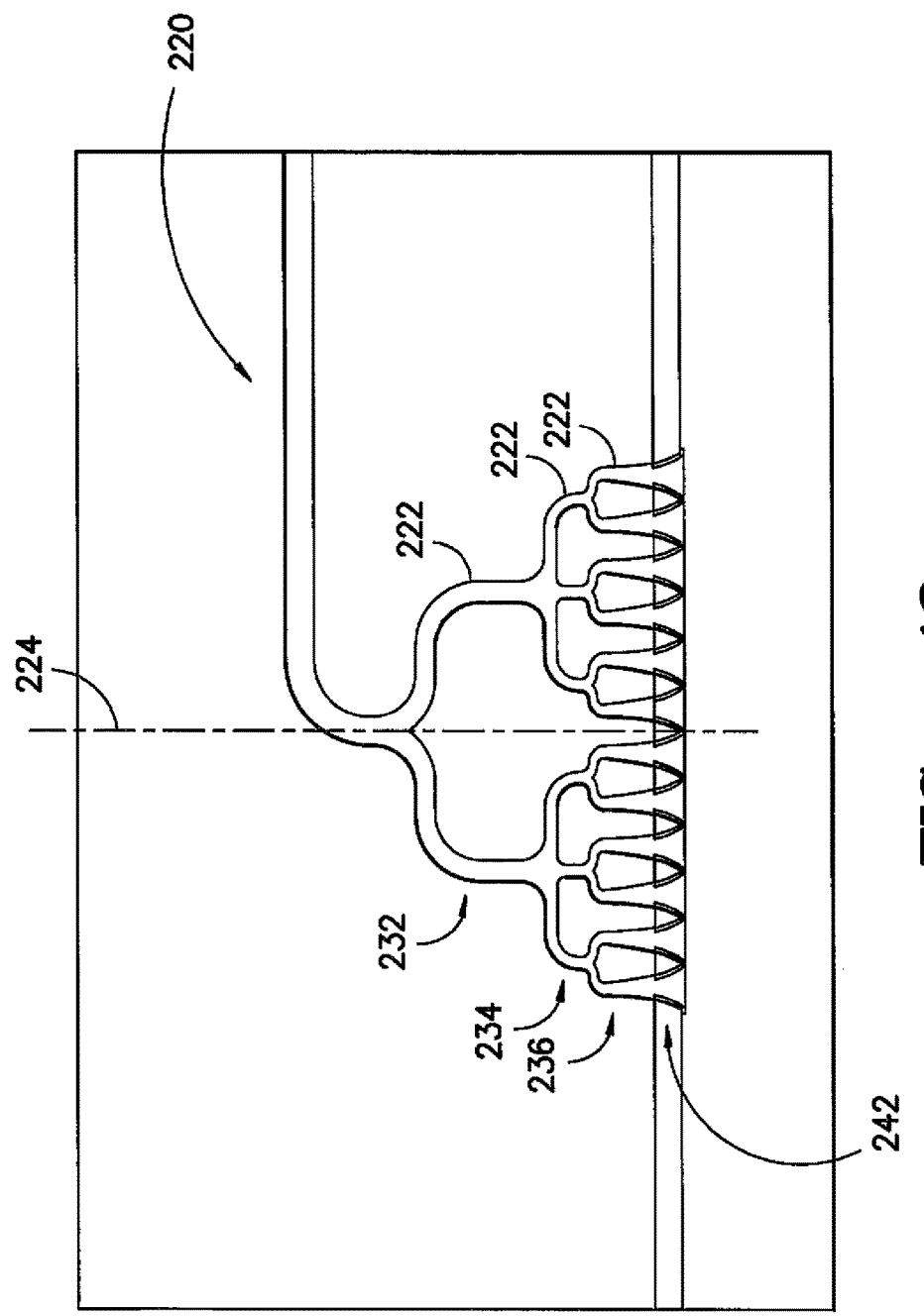
FIG. -12-

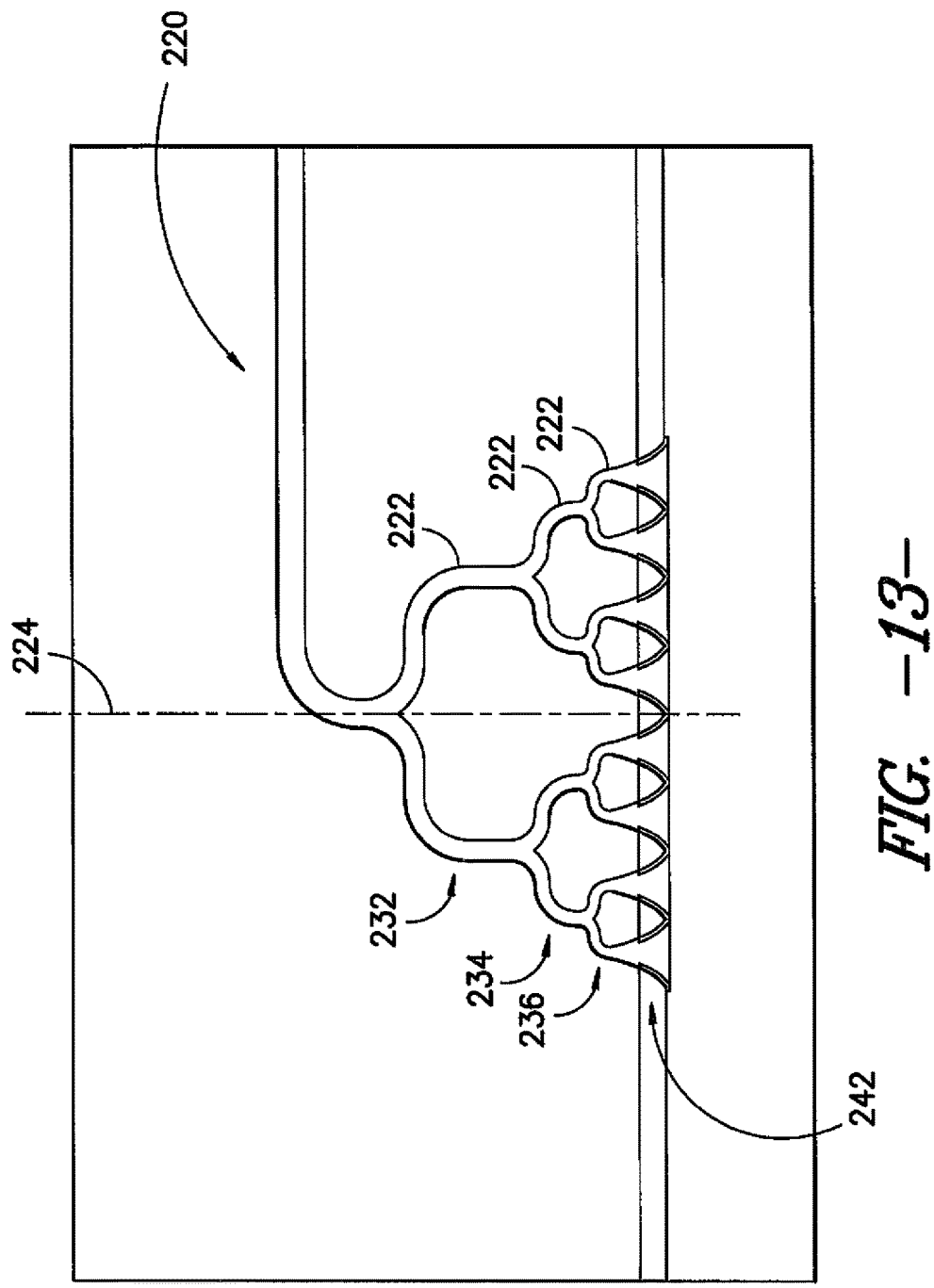
FIG. -13-

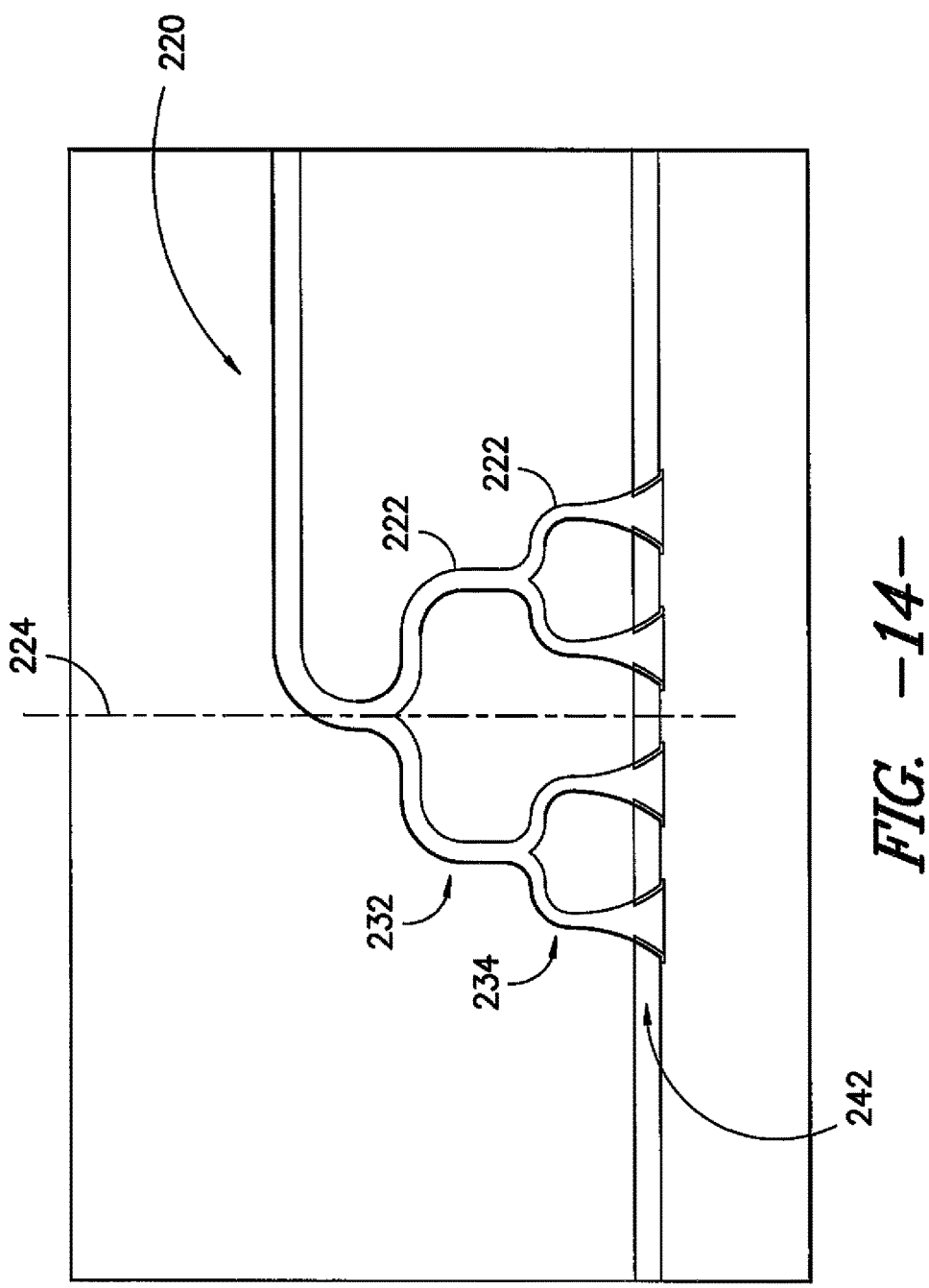

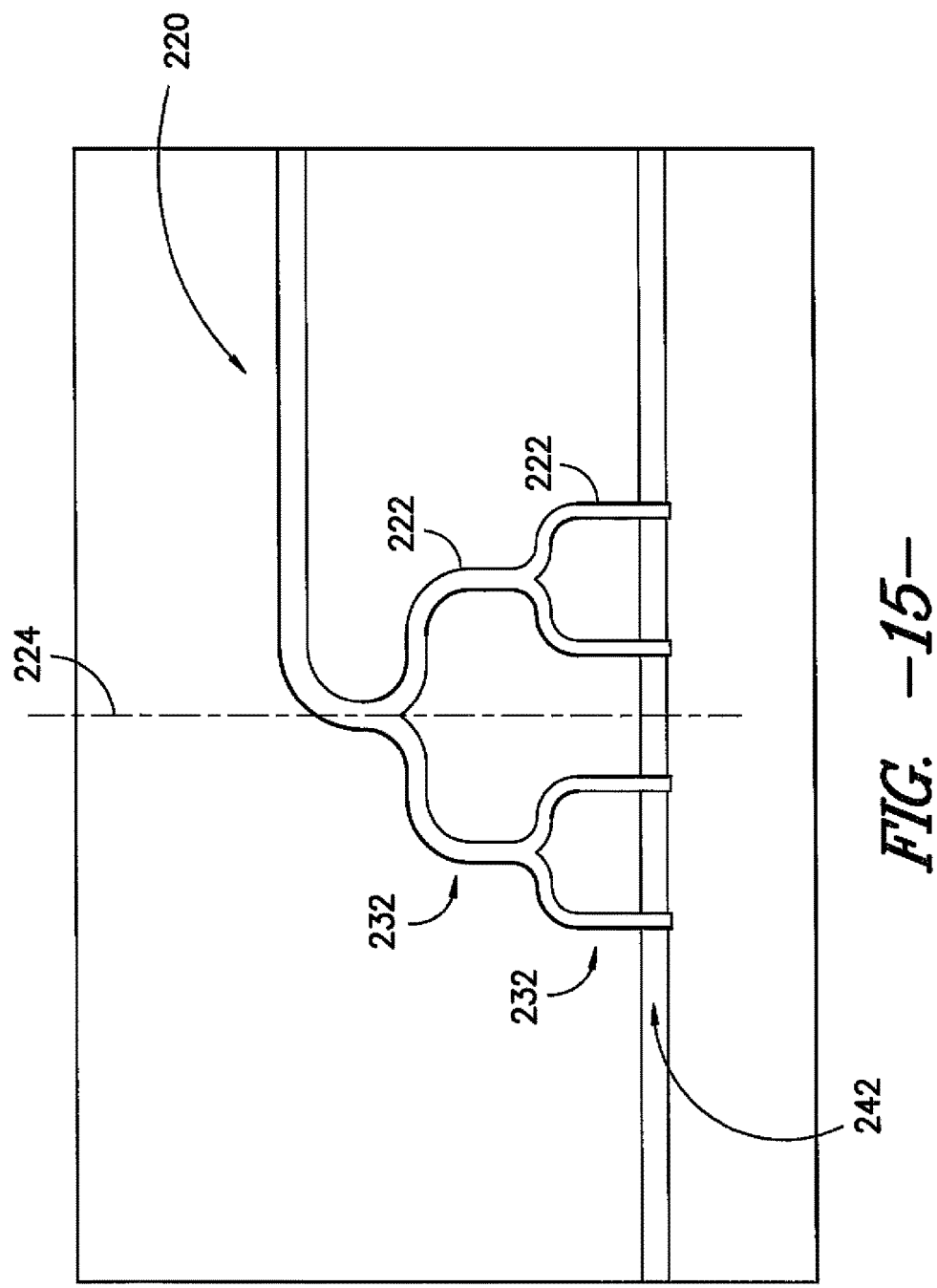
FIG. -15-

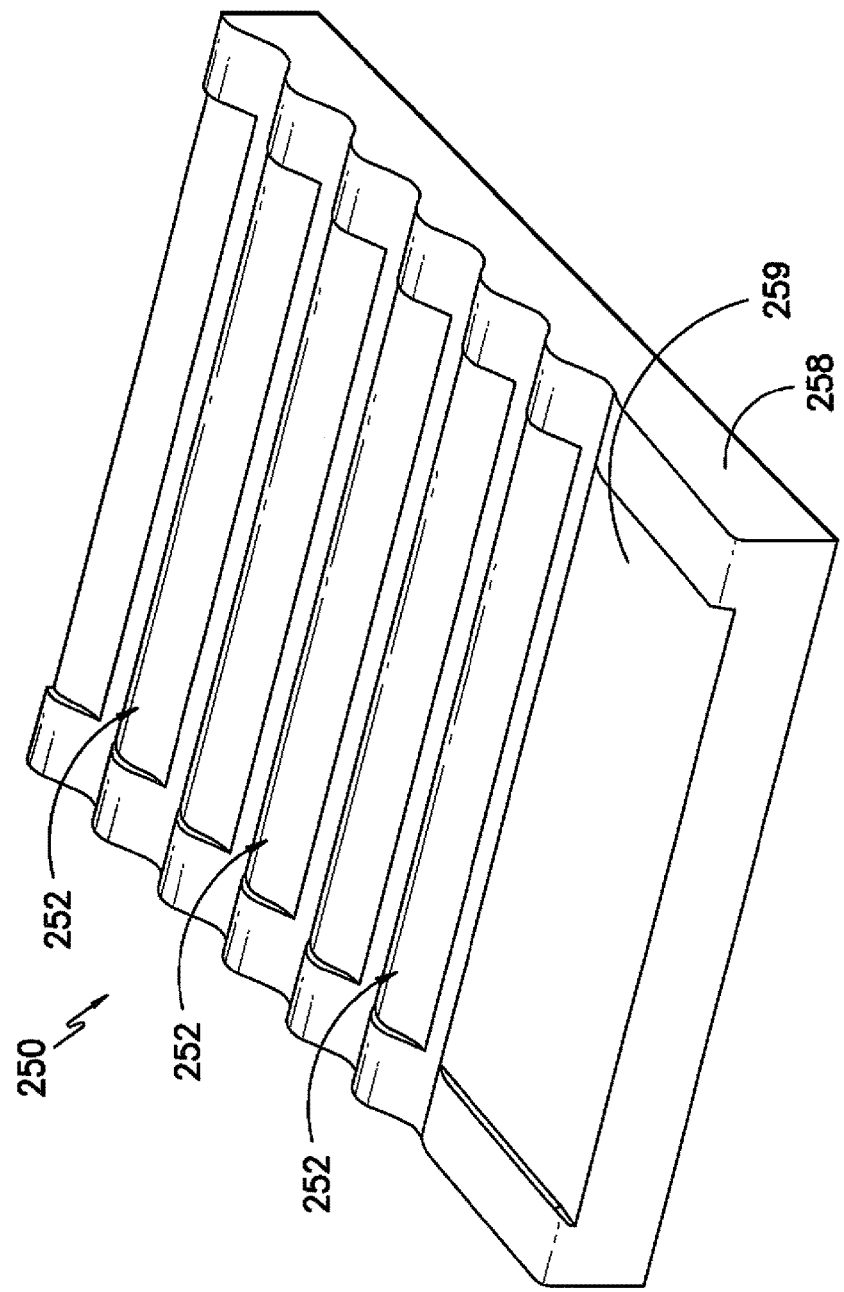

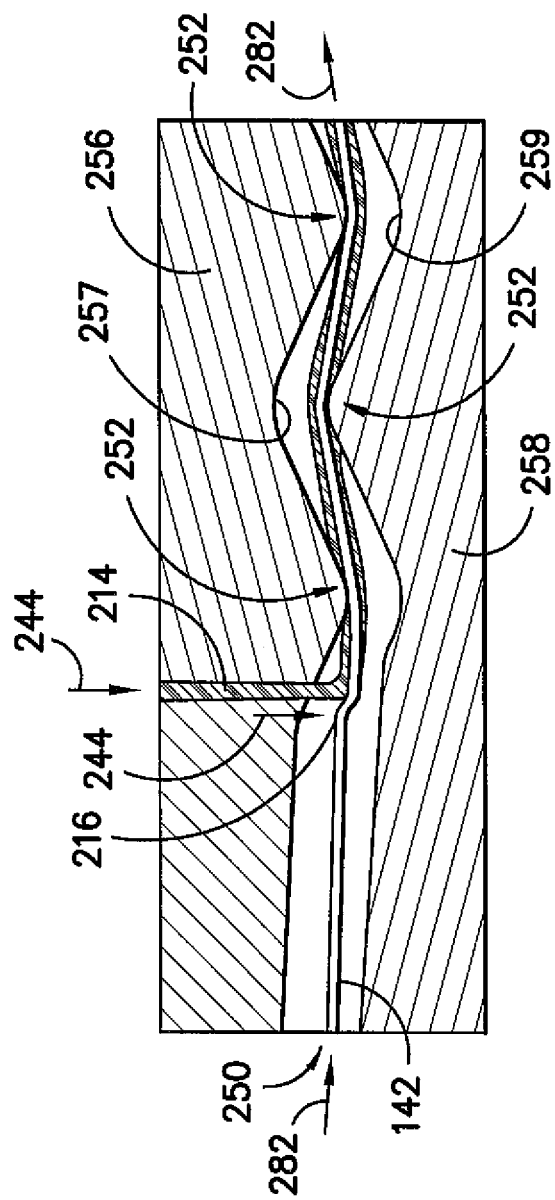
FIG. -17-

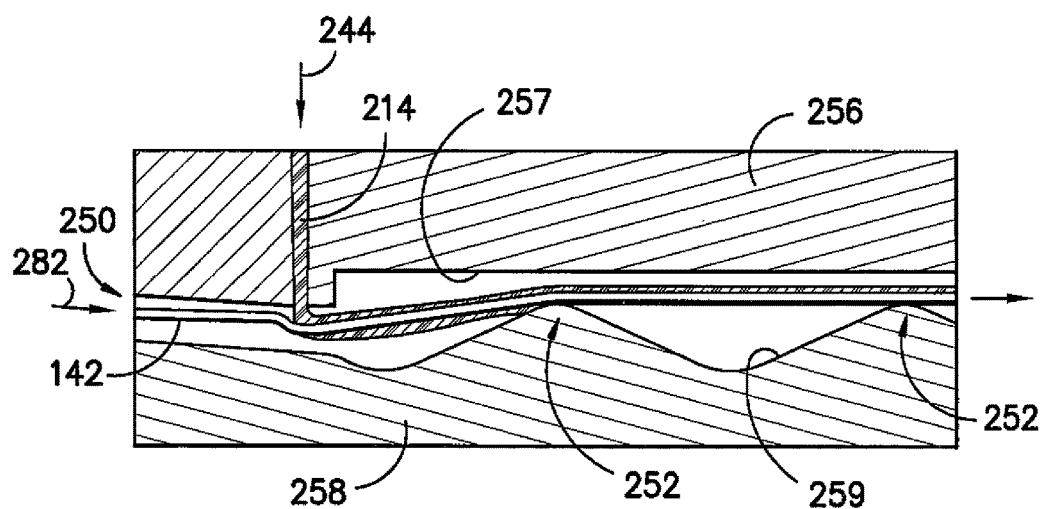
FIG. -18-
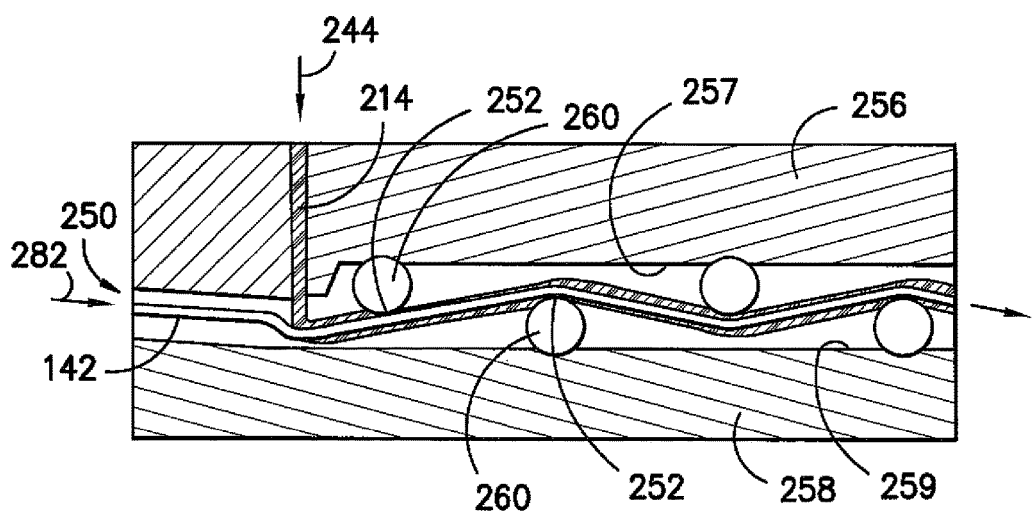
FIG. -19-

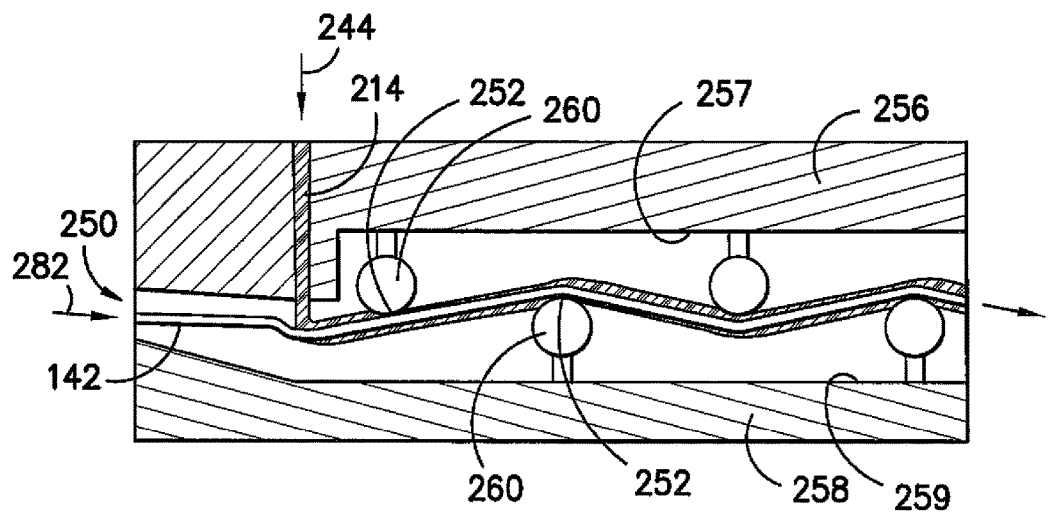
FIG. -20-
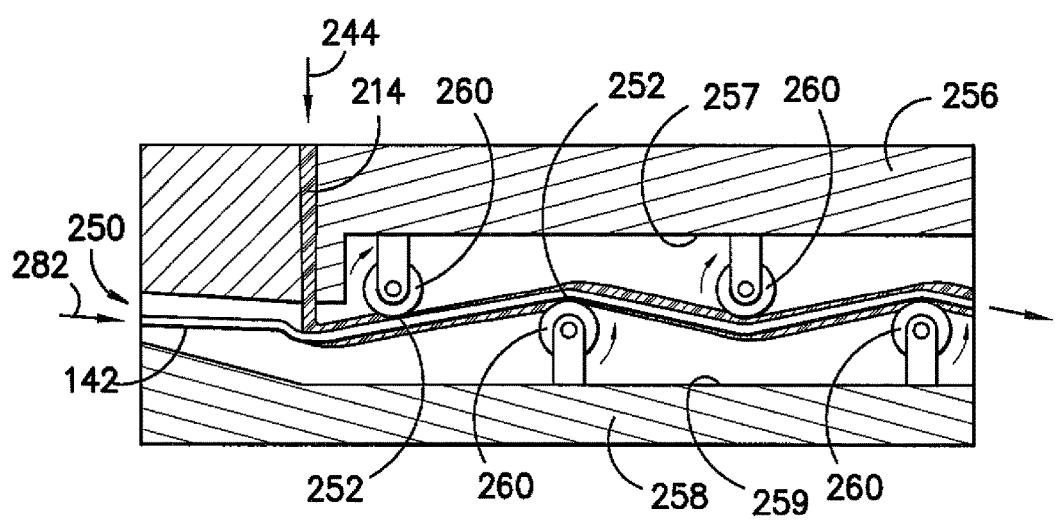
FIG. -21-

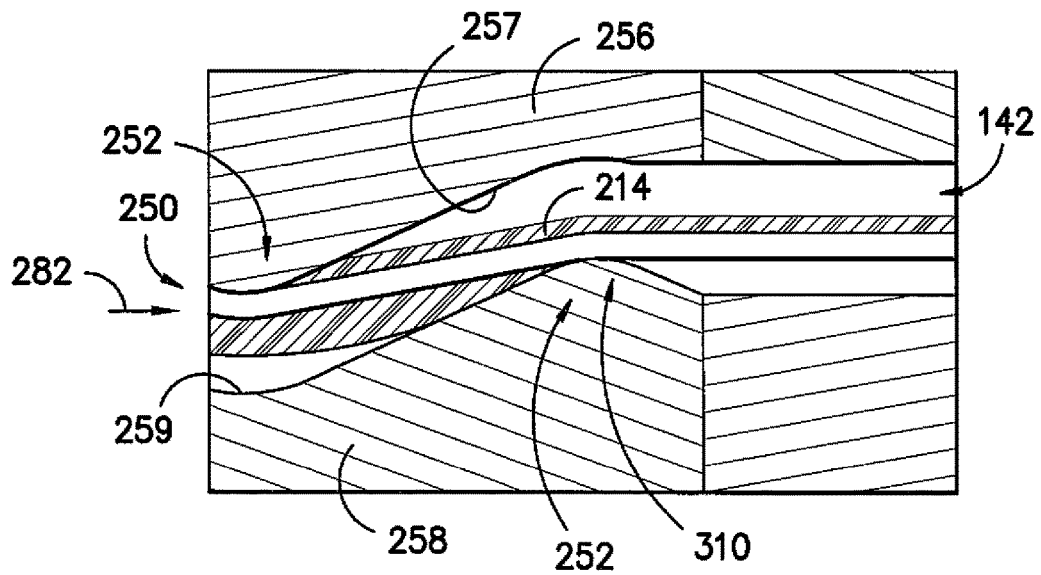
FIG. -22-
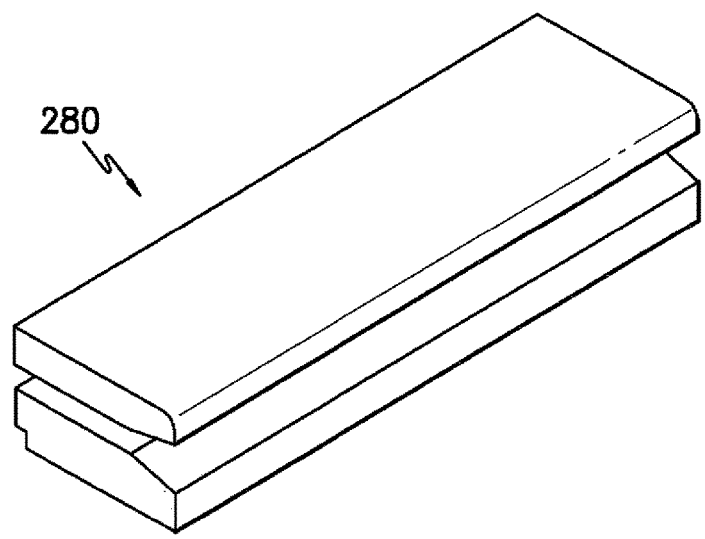
FIG. -23-

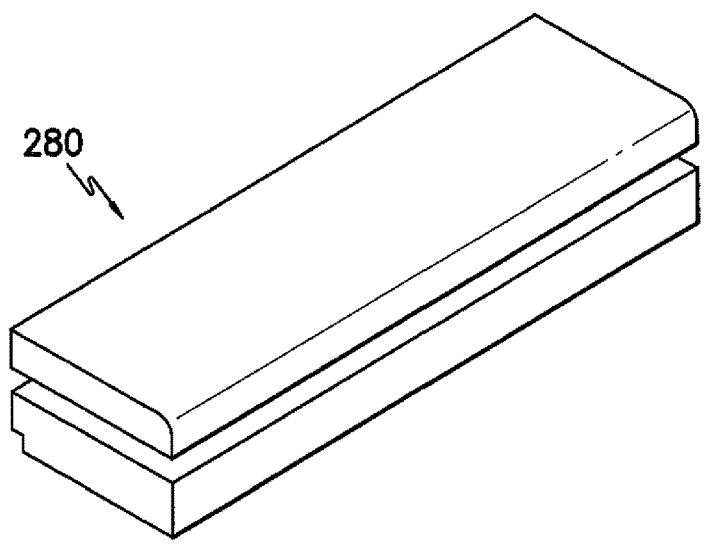
FIG. -24-
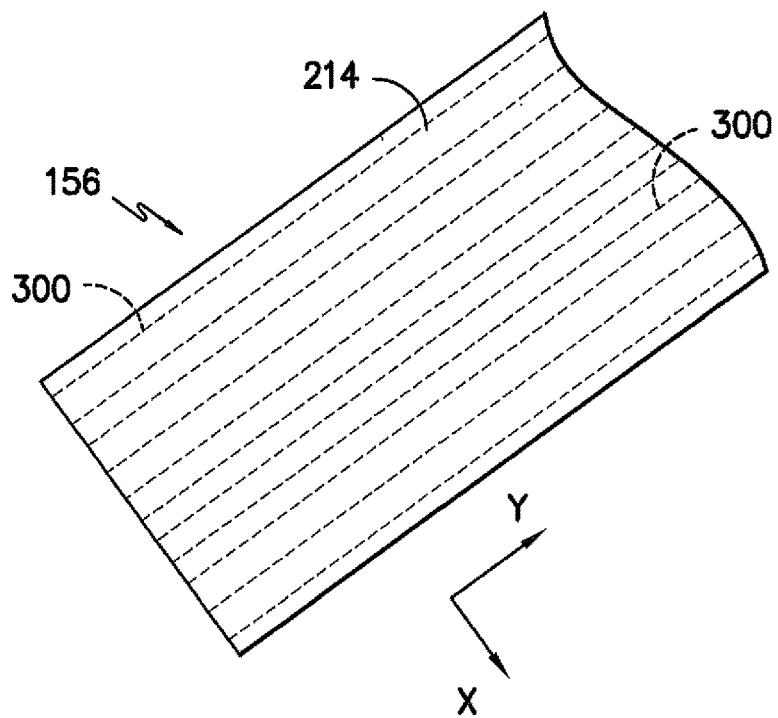
FIG. -25-

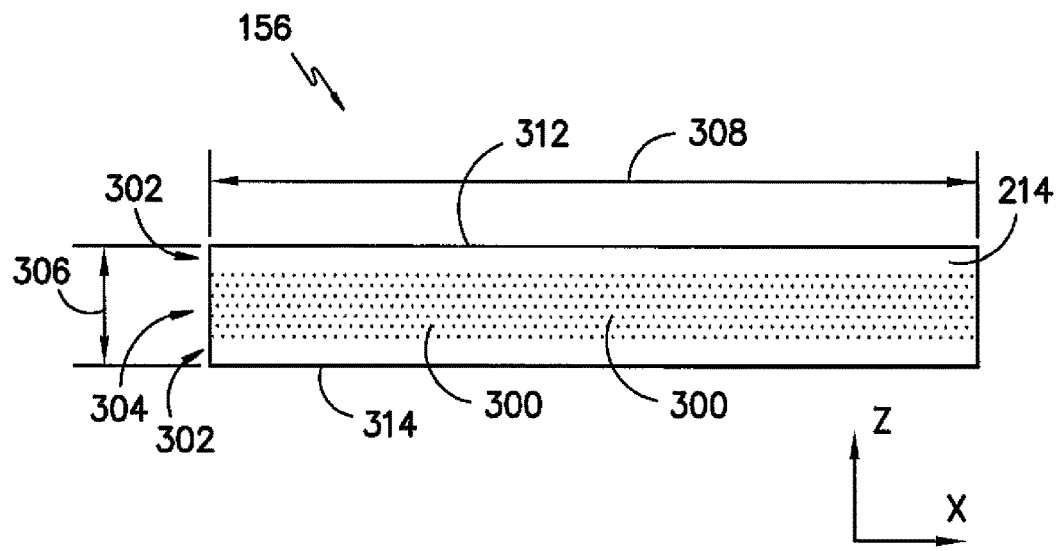
FIG. -26-
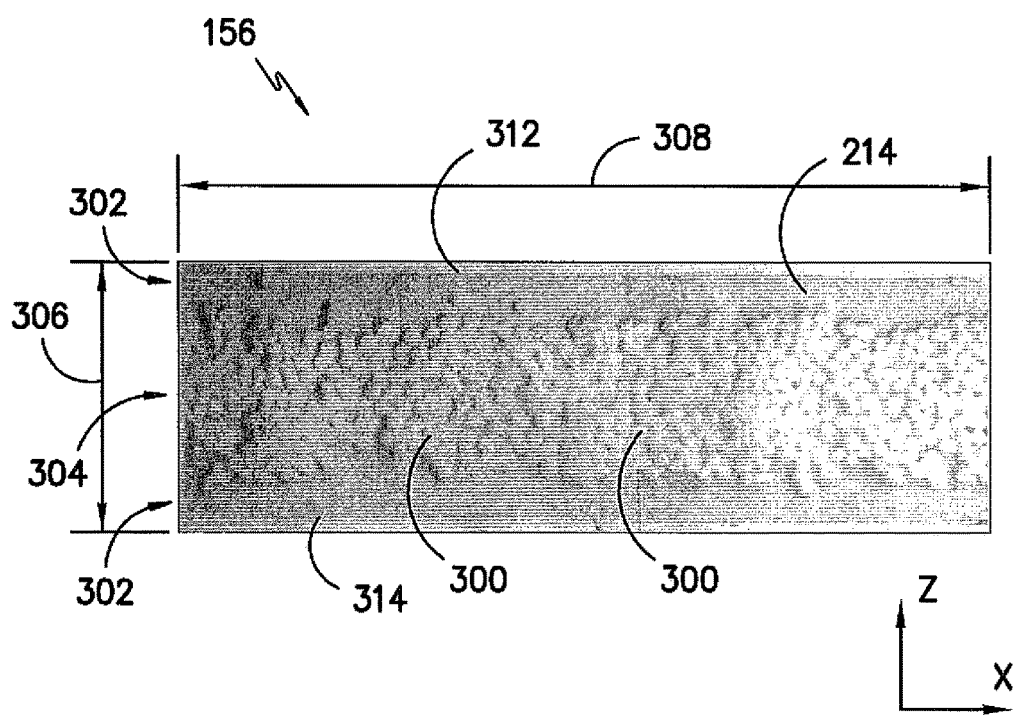
FIG. -27-

EXTRUDER AND METHOD FOR PRODUCING HIGH FIBER DENSITY RESIN STRUCTURES

RELATED APPLICATIONS

This application claims priority to PCT International Application No. PCT/US2012/047340, filed Jul. 19, 2012; U.S. Provisional Patent Application Ser. No. 61/510,682, filed Jul. 22, 2011; and U.S. Provisional Patent Application Ser. No. 61/660,208, filed Jun. 15, 2012, all of which are incorporated by reference herein in their entireties.

FIELD

The present disclosure generally relates to extruders for producing fiber reinforced resin structures, and is specifically concerned with both an extruder and method for efficiently producing high-fiber density reinforced resin structures with minimum down time. The present disclosure further relates to tapes with improved bonding properties, and methods for producing such tapes.

BACKGROUND

Extruders for producing fiber-reinforced resin structures through a thermoplastic pultrusion operation are known in the art. Such extruders typically include the combination of a thermoplastic pultrusion impregnation chamber (known as a wet-out die in the art), a faceplate mounted over the downstream end of the chamber, and a roving puller located downstream of the faceplate. The impregnation chamber includes a slot-like channel through which string-like bundles of reinforcing fibers (hereinafter referred to as rovings) are impregnated with molten thermoplastic resin. The faceplate may include a plurality of sizing holes (sometimes referred to as shaping holes) or a single slot through which resin-impregnated rovings from the impregnation chamber are drawn, depending upon the type of faceplate used. The roving puller pulls the rovings through the die channel and the sizing holes or slot of the faceplate. In operation, hot, pressurized molten resin is continuously introduced into the channel as the rovings are pulled through the channel and through the faceplate by the puller. The resin-impregnated rovings are pultruded in parallel through the sizing holes or single slot of the faceplate to form elongated, fiber-reinforced structures whose cross-sectional shapes are defined by shape of the opening or openings in the faceplate. While sizing holes can have any one of a number of different shapes, they are typically round or slot-shaped and consequently produce pultrusions that are rod-shaped or ribbon-shaped in cross-section. Faceplates having a single slot produce a single sheet-shaped pultrusion. As the thermoplastic resin component of the pultrusions is still at least semi-molten immediately after the pultrusions are drawn from the sizing holes, the pultrusions may easily be further shaped into a desired final product. For example, if the final product is to be fiber-reinforced tape, parallel rod-like pultrusions exiting the faceplate may be squeezed between the nip of a pair of parallel rollers to form a resin sheet reinforced by a parallel array of fibers. After cooling, the sheet may be cut parallel along the fibers into strips to form a fiber-reinforced tape.

When making fiber-reinforced tape, it is desirable that the final product have a relatively high volume (i.e. >50%) of reinforcing fibers relative to the thermoplastic resin in order to have a high tensile strength. However, the applicants have observed that it is difficult to efficiently produce high fiber volume tapes with conventional extruders. Specifically, the applicants have found that the shaping holes or slot in the faceplate frequently become plugged with broken or loose fibers when the fiber volume of the resin/fiber mix pultruded through shaping holes exceeds 50%. When the sizing holes become partially plugged with such fiber debris, it can damage the roving, thereby degrading the tensile strength and hence the quality of the final product. Worse yet, such partially plugged holes often continue to accumulate fiber debris, which can result in the breakage one or more of the ravings. Should this occur, the extruder produces only scrap until the broken roving is replaced. Of course, the replacement of such a broken roving can only be achieved by shutting down production and restringing a roving through the wet-die and the formerly-plugged sizing hole of the faceplate.

The applicants have further observed that such undesirable plugging of the sizing holes is exacerbated when highly viscous thermoplastics of high molecular weight are used. Such viscous thermoplastics must be continuously subjected to relatively high pressures within the pultrusion impregnation chamber if they are to completely impregnate the rovings being pulled therethrough, and are subject to pressure surges during the operation of the extruder as a result of imbalances between the amount of thermoplastic being introduced into the chamber and the amount being withdrawn from the chamber by the resin impregnated rovings. During such surges, the resulting higher pressure of the resin in the sizing holes encourages loose or broken fibers from the roving to partially plug the holes, which in turn causes the resin pressure to further spike, thereby further promoting the plugging of the sizing holes. Such pressure surges normally do not occur, as the operators of the extruder are careful to balance the volume of the molten resin and roving moving through the die with the volume of the rods or ribbons pultruded through the sizing holes of the faceplate. However, small surges of a few pounds per square inch are unavoidable with present extruders during a production speed-up operation or a roving change-over operation. The applicants have observed that even a small pressure surge of 5% above normal can initiate the aforementioned plugging negative feedback loop when high fiber volume structures are being produced.

Clearly, there is a need for an extruder capable of continuously producing reinforced resin structures having fiber volume contents of 50% or greater without the plugging of the faceplate sizing holes even during pressure surges in the resin.

Further, problems exist with presently known fiber reinforced tapes, such as those generated by conventional extruders, in many applications, such as subsea applications. For example, tapes may be wrapped around existing products, such as pipe sections, to reinforce the pipe sections. However, presently known tapes may not adequately bond with such products to provide sufficient reinforcement.

As such, a need currently exists for an improved fiber reinforced polymer tape and method for forming a polymer reinforced polymer tape. Specifically, a need currently exists for tapes methods that provide improved bonding properties. Additionally, such tapes may provide the desired strength, durability, and temperature performance demanded by particular applications.

SUMMARY

The present disclosure is directed to both an extruder and a method for producing high-density fiber reinforced thermoplastic resin structures that overcomes the aforementioned shortcomings associated with the prior art. The extruder includes an impregnation chamber having a channel that applies pressurized molten thermoplastic resin to a plurality of fiber rovings drawn through the channel, and a die faceplate facing the downstream side of said die. The faceplate has a plurality of sizing holes or a slot that the resin-impregnated rovings are simultaneously drawn through that removes excess resin and extrudes the resin-impregnated roving into elongated structures. Most importantly, the faceplate is not mounted directly over the downstream end of the impregnation chamber as in the prior art, but instead is spaced apart from the downstream side of the impregnation chamber.

The resulting gap between the die and the spaced-apart faceplate allows excess resin sheared off from the resin-impregnated rovings to freely backflow from the sizing holes without pressure build up. Consequently, loose and broken fibers are much less likely to accumulate in and plug the sizing holes of the faceplate that can damage or break the fibers as they are drawn through the die and holes of the faceplate. In the event that such accumulation begins to occur, the room between the faceplate and the impregnation chamber that the spacing of the faceplate creates allows the backflow of resin and broken fibers to be removed by a system operator.

The inventive extruder is advantageously insensitive to surges in the pressure of the molten resin in the impregnation chamber. By moving the face plate away from the die, a space is created that allows the molten polymer to flow without a pressure build up in the shear area surrounding the sizing holes of the faceplate, thus eliminating the criticality of precisely balancing the volume of thermoplastic entering and exiting the impregnation chamber. The applicants' tests have confirmed that no such plugging occurs during despite the imposition of much larger pressure surges in the molten resin that would normally occur during production, even when the fiber volume content of the resulting extrusions is in excess of 60%. The invention is applicable to thermoplastic pultrusion extruders using either unitary or floating, split faceplates.

In the preferred embodiment, the faceplate is spaced apart from the downstream end of the impregnation chamber between about 4 and 24 inches, and the extruder may further include a mounting assembly that includes a pair of guide rods slidably connected to the faceplate that allows the distance between the die and a back side of the faceplate to be adjusted.

The inventive extruder may further include a resin recycler for recycling excess resin sheared off from the roving by the sizing holes of the faceplate. In the preferred embodiment, the recycler is a conveyor belt that periodically conveys the excess resin that falls from the back of the faceplate back to a resin source.

The disclosure further encompasses a method of producing high fiber content resin structures with an extruder, comprising providing a impregnation chamber having a channel that applies pressurized molten resin to an elongated roving of fibers drawn through the channel, the die having an upstream side, providing a die faceplate facing the downstream side of said die, the faceplate having at least one sizing hole that the resin-impregnated roving is drawn through that removes excess resin and extrudes the resin-impregnated roving into a desired shape, spacing apart the faceplate from the downstream side of the impregnation chamber to provide a gap between the die and a back side of the faceplate that allows excess resin removed from the resin-impregnated roving to freely backflow from said sizing hole without pressure build up; and simultaneously drawing an elongated roving of fibers through the channel while wetting the fibers with pressurized molten resin, wherein a cross-sectional area of the roving is at least 50% of a smallest cross-sectional area of the sizing hole such that the resulting fiber-reinforced structure has a fiber volume greater than 50%.

In other embodiments, the present disclosure is directed to a tape. The tape includes a polymer resin and a plurality of fibers embedded in the polymer resin to form a fiber reinforced polymer material. The fibers are disposed in the fiber reinforced polymer material to form a first resin rich portion, a second resin rich portion, and a fiber rich portion disposed between the first resin rich portion and the second resin rich portion. The tape is formed by a process that includes the steps of flowing a polymer resin through a manifold assembly of a die, the manifold assembly comprising a plurality of branched runners, and coating at least one fiber roving with the resin. The process further includes the steps of traversing the coated roving through an impregnation zone of the die to impregnate the roving with the resin, and drawing the impregnated roving through a faceplate spaced apart from a downstream side of the die. Further, in some embodiments, the process includes rolling the impregnated roving through a roller.

In still other embodiments, the present disclosure is directed to a method for impregnating at least one fiber roving with a polymer resin to form a tape. The method includes flowing a polymer resin through a manifold assembly of a die, the manifold assembly comprising a plurality of branched runners, and coating at least one fiber roving with the resin. The method further includes traversing the coated roving through an impregnation zone of the die to impregnate the roving with the resin, and drawing the impregnated roving through a faceplate spaced apart from a downstream side of the die. Further, in some embodiments, the method includes rolling the impregnated roving through a roller.

The tape formed by methods according to the present disclosure may include a polymer resin and a plurality of fibers embedded in the polymer resin to form a single layer of fiber reinforced polymer material. The fibers disposed in the fiber reinforced polymer material form a first resin rich portion, a second resin rich portion, and a fiber rich portion disposed between the first resin rich portion and the second resin rich portion.

Other features and aspects of the present invention are set forth in greater detail below.

BRIEF DESCRIPTION OF THE DRAWINGS

FIG. 1 is a side schematic view of the extruder of a first embodiment of the invention;

FIG. 2 is a perspective view of the impregnation chamber and spaced-apart faceplate of the extruder;

FIG. 3 is a side cross sectional view of the impregnation chamber and faceplate of FIG. 2;

FIG. 4A is a side view of an alternative embodiment of the extruder of the invention which uses a floating split faceplate, while FIG. 4B is a perspective, exploded view of the floating split faceplate used in this alternative embodiment;

FIGS. 5A and 5B are microphotographs of a reinforced tape product made by the extruder of the invention across the width and length of the product, respectively;

FIGS. 6A and 6B are microphotographs of a reinforced tape product made by a conventional extruder across the width and length of the product, respectively;

FIG. 7 is a graph comparing the volume percentage (designated "Glass Vol %") and weight percentage (designated "Ash Vol %)" of glass fibers in a reinforced tape product made by a conventional prior art extruder and by the offset faceplate extruder of the invention under (a) normal resin pressure conditions (b) a 40% resin overpressure condition and (c) a 57% resin overpressure condition, respectively;

FIG. 8A is a graph comparing the range of tensile strengths of reinforced tape products made by a conventional extruder and by the extruder of the invention at a 57% resin overpressure condition, while FIG. 8B is a graph comparing the range of tensile strengths of an annealed and unannealed reinforced tape product made by a conventional extruder with a range of tensile strengths of an unannealed reinforced tape product made by the extruder of the invention at normal resin pressure conditions;

FIG. 9 is an exploded view of one embodiment of a manifold assembly and gate passage for a die that may be employed in the present disclosure;

FIG. 10 is a plan view of one embodiment of a manifold assembly that may be employed in the present disclosure;

FIG. 11 is a plan view of another embodiment of a manifold assembly that may be employed in the present disclosure;

FIG. 12 is a plan view of another embodiment of a manifold assembly that may be employed in the present disclosure;

FIG. 13 is a plan view of another embodiment of a manifold assembly that may be employed in the present disclosure;

FIG. 14 is a plan view of another embodiment of a manifold assembly that may be employed in the present disclosure;

FIG. 15 is a plan view of another embodiment of a manifold assembly that may be employed in the present disclosure;

FIG. 16 is a perspective view of one embodiment of a second impregnation plate at least partially defining an impregnation zone that may be employed in the present disclosure;

FIG. 17 is a close-up cross-sectional view, as indicated in FIG. 3, of one embodiment of a portion of an impregnation zone that may be employed in the present disclosure;

FIG. 18 is a close-up cross-sectional view of another embodiment of a portion of an impregnation zone that may be employed in the present disclosure;

FIG. 19 is a close-up cross-sectional view of another embodiment of a portion of an impregnation zone that may be employed in the present disclosure;

FIG. 20 is a close-up cross-sectional view of another embodiment of a portion of an impregnation zone that may be employed in the present disclosure;

FIG. 21 is a close-up cross-sectional view of another embodiment of a portion of an impregnation zone that may be employed in the present disclosure;

FIG. 22 is a close-up cross-sectional view, as indicated in FIG. 3, of one embodiment of a downstream end portion of an impregnation zone that may be employed in the present disclosure;

FIG. 23 is a perspective view of one embodiment of a land zone that may be employed in the present disclosure;

FIG. 24 is a perspective view of another embodiment of a land zone that may be employed in the present disclosure;

FIG. 25 is a perspective view of one embodiment of a tape for use in the present disclosure;

FIG. 26 is a cross-sectional view of another embodiment of a tape for use in the present disclosure; and FIG. 27 is a cross-sectional microscopy image of another embodiment of a tape for use in the present disclosure.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention.

With reference to FIG. 1, wherein like numerals designate like components throughout all of the several figures, the extruder 1 of the invention generally comprises a impregnation die or chamber 3 having a slot-like channel 4 extending through its length, a faceplate 5 spaced apart from the impregnation chamber 3 such that a gap 6 is present between the faceplate 5 and the die 3, and a roving puller 7 that draws a plurality of string-like rovings 142 through the slot-like channel 4 of the impregnation chamber and through sizing holes in the faceplate 5. A resin supply 15 connected to a resin nozzle inlet 16 continuously provides a flow of molten resin to the slot-like channel 4 of the impregnation chamber in order to saturate the rovings with molten resin as they are pulled through the channel 4 by the roving puller 7.

As used herein, the term "roving" generally refers to a bundle of individual fibers 300. The fibers 300 contained within the roving can be twisted or can be straight. The rovings may contain a single fiber type or different types of fibers 300. Different fibers may also be contained in individual rovings or, alternatively, each roving may contain a different fiber type. The continuous fibers employed in the rovings possess a high degree of tensile strength relative to their mass. For example, the ultimate tensile strength of the fibers is typically from about 1,000 to about 15,000 Megapascals ("MPa"), in some embodiments from about 2,000 MPa to about 10,000 MPa, and in some embodiments, from about 3,000 MPa to about 6,000 MPa. Such tensile strengths may be achieved even though the fibers are of a relatively light weight, such as a mass per unit length of from about 0.05 to about 2 grams per meter, in some embodiments from about 0.4 to about 1.5 grams per meter. The ratio of tensile strength to mass per unit length may thus be about 1,000 Megapascals per gram per meter ("MPa/g/m") or greater, in some embodiments about 4,000 MPa/g/m or greater, and in some embodiments, from about 5,500 to about 20,000 MPa/g/m. Such high strength fibers may, for instance, be metal fibers, glass fibers (e.g., E-glass, A-glass, C-glass, D-glass, AR-glass, R-glass, S-glass such as S1-glass or S2-glass, etc.), carbon fibers amorphous carbon, graphitic carbon, or metal-coated carbon, etc.), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic and/or thermoset compositions. Carbon fibers are particularly suitable for use as the continuous fibers, which typically have a tensile strength to mass ratio in the range of from about 5,000 to about 7,000 MPa/g/m. The continuous fibers often have a nominal diameter of about 4 to about 35 micrometers, and in some embodiments, from about 9 to about 35 micrometers. The number of fibers contained in each roving can be constant or vary from roving to roving. Typically, a roving contains from about 1,000 fibers to about 50,000 individual fibers, and in some embodiments, from about 5,000 to about 30,000 fibers.

Any of a variety of thermoplastic or thermoset polymers may be employed to form the polymer matrix (or "resin") in which the continuous fibers are embedded. For example, suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., PA12, Nylon™), polyether ketones (e.g., polyether ether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth.

The properties of the polymer matrix are generally selected to achieve the desired combination of processability and performance. For example, the melt viscosity of the polymer matrix is generally low enough so that the polymer can adequately impregnate the fibers. In this regard, the melt viscosity typically ranges from about 25 to about 1,000 Pascal-seconds ("Pa-s"), in some embodiments from 50 about 500 Pa-s, and in some embodiments, from about 60 to about 200 Pa-s, determined at the operating conditions used for the polymer (e.g., about 360° C.). Likewise, when the impregnated ravings are intended for applications involving high temperatures, a polymer is employed that has a relatively high melting temperature. For example, the melting temperature of such high temperature polymers may range from about 200° C. to about 500° C., in some embodiments from about 225° C. to about 400° C., and in some embodiments, from about 250° C. to about 350° C.

With reference now to FIGS. 1 and 2, an adjustable indenting assembly 17 mounts the faceplate 5 in spaced apart relationship to the downstream end of the impregnation chamber. As is best seen in FIG. 2, the mounting assembly 17 includes a pair of parallel guide rods 19a, 19b which slidably extend through bores 21a, 21b provided on the sides of the faceplate 5 and having diameters only slightly larger than the outer diameters of the rods 19a, 19b. A pair of set screws 23a, 23b affixes the faceplate 5 at a selected position along the length of the guide rods 19a, 19b. The axes of rotation of both the rods 19a, 19b and the bores 21a, 21b are orthogonal with respect to the downstream surface of the impregnation chamber 3 and the upstream and downstream surfaces of the faceplate in order to maintain these surfaces in a parallel relationship regardless of the specific position selected for the faceplate 5 along the axes of the guide rods 19a, 19b. In the preferred embodiment, the mounting assembly 17 is adjusted so that the upstream side of the faceplate 5 is between about four and twenty-four inches from the downstream side of the impregnation chamber, as such spacing provides ample room for excess resin to backflow through the sizing holes without pressure build up, as well as room for the system operator to clear excess resin away from any of the sizing holes of the faceplate 5 that are becoming partially plugged by loose or broken fibers from the rovings 142.

The extruder 1 also has a resin recycler 25 which may include a small conveyor belt 27 located beneath the upstream side of the faceplate 5, and a resin receptacle 28 located at an end of the conveyor 27. During operation of the extruder 1, the conveyor 27 catches excess molten resin that drips from the upstream side of the faceplate 5 and periodically conveys this excess resin to the receptacle 28, which is either automatically or manually carried back to the resin supply 15 for recycling Finally, the extruder 1 includes, in this embodiment, a pair of squeezing rollers 29a, 29b located downstream of the faceplate 5. As will be described in more detail hereinafter, the squeezing rollers 29a, 29b squeeze the rod-like extrusions exiting the downstream side of the faceplate into a single, high fiber volume sheet that may be cut into longitudinal strips to form a high fiber volume tape product.

With reference in particular to FIG. 3, the impregnation chamber 3 includes a die body 30. Die body 30 has a slot-shaped channel entrance 32 on its upstream side 33 that receives the rovings 142, and a slot-shaped channel exit 34 on its downstream side 35 where resin-impregnated rovings 142 leave the die 3. In its central region, the channel 4 includes approximately six undulations 252 having a roughly sine-wave profile. Such undulations 252 promote the soaking of the rovings 142 with the molten resin that is continuously supplied to the channel 4. Specifically, as the rovings 142 are pulled through the channel 4, some of the relatively viscous molten resin that immerses them sticks to the sides of the rovings 142. When the rovings 142 approach the alternating peaks of the undulations 252, some of this side-sticking molten resin is forcefully "wedged" into the side of the rovings 142, thus allowing molten resin to come into intimate contact with roving fibers located close to the axial center of the rovings 142. Die body 30 further includes a pattern of interconnected resin-conducting bores 222 traversing the width of the die 3 which are connected to the resin inlet nozzle 16. The purpose of the pattern of bores 222 is to uniformly distribute molten resin across the width of the slot-shaped channel 4.

With reference again to FIGS. 2 and 3, the faceplate 5 has a row of uniformly-spaced sizing holes 42 that receive the resin-impregnated rovings 142 from the slot-shaped channel exit 34 of the die 3. As is shown in FIG. 3, each of the sizing holes 42 is frusto-conically shaped, having an entrance diameter 44 on the upstream side 45 of the faceplate 5 that is larger than its exit diameter 46 on the downstream side 47 of the faceplate 5. By way of example, the entrance diameter may be between about 0.060-0.100 inches, the exit diameter may be between about 0.040-0.080 inches, and the thickness of the faceplate 5 (which defines the length of the sizing holes 42) may be between about 1.00 to 2.00 inches. Accordingly, the taper of the sizing holes 42 is quite small. Nonetheless, such tapering is important, if not critical to the formation of resin saturated rovings, as the tapering effectively shears the molten resin between the fibers forming the roving. While the sizing holes 42 in this example of the invention are frusto-conical in shaped with circular entrances and exits, they could be any one of a number of shapes, such as for example tapered slot-shapes with rectangular entrances and exits. As illustrated in FIG. 3, the sizing holes 42 extrude rod-shaped structures 50, although these structures could also be for example ribbon-shaped in the case of slot-shaped sizing holes. These structures 50 are pulled through the nip of squeezing rollers 29a, 29b to form a single, continuous high fiber volume sheet 52, which is cut into longitudinal strips to form fiber reinforced tape.

FIGS. 4A and 4B illustrate an alternative embodiment 55 of the extruder that uses a thermoplastic pultrusion impregnation chamber 3 as previously described in combination with a floating split faceplate 60 in lieu of the unitary-type faceplate 5 used in association with the first embodiment 1. In this alternative embodiment 55, the floating split faceplate 60 includes a rectangular lower plate 62 having a tapered upper edge 64, and a rectangular upper plate 66 having a tapered lower edge 68. "T" shaped openings 69 are provided on-either side of the lower plate 62 for slidably receiving parallel rails of a mounting assembly 17, while frustroconical holes 70 are provided in the mid-portion of the upper plate 66 for receiving tapered pins (not shown) of the mounting assembly. Side mountings (also not shown) maintain the plates 62, 66 in the alignment shown in FIG. 4A during operation of the extruder 55, and the sliding interaction of the tapered pin of the mounting assembly with the frustroconical holes 70 allows the distance between the opposing edges 64 and 6 of the plates 62 and 66 to be finely adjusted in accordance with a wedging action between the pins and the holes 70. As is best seen in FIG. 4A, the opposing tapered edges 64 and 68 define a tapered slot 75 which performs the same function as the previously-described sizing holes 42. As is shown in FIG. 4B, the sides of the slot 75 are flanked by cutouts 77a, 77b and 79a, 79b in the lower plate 62 and upper plate 66, respectively. During a pultrusion operation, a sheet-like roving 142 is introduced into the thermoplastic pultrusion impregnation chamber 3, thus producing a resin-impregnated roving 83. As this resin-impregnated roving 83 is pulled through the tapered slot 75 to form a sheet-shaped structure 85, these cutouts 77a, 77b and 79a, 79b advantageously allow excess molten resin scraped from the resin-impregnated roving 83 to flow out of the sides of the slot 75.

The operation of the first embodiment of the extruder 1 will now be described in detail. First, rovings 142 are first strung through the channel 4 of the impregnation chamber 3 and the sizing holes 42 of the faceplate 5. The rovings 142 may be either string-like bundles or strip-like bundles of parallel fibers (depending on the shape of the sizing holes 42) and may be formed from, for example, carbon, aramid, e-glass or c-glass. In the case of carbon, the fibers forming the rovings 142 are typically between about 5 to 10 microns in diameter. In the case of e-glass, s-glass or c-glass, the fibers are typically 9-30 microns in diameter. In order to produce a high-fiber volume structure, the cross-sectional area of the rovings 142 should be at least 50% of the cross-sectional area of the exit diameter 46 of the sizing holes 42. Such proportioning assures that the volume content of the fibers will be at least 50% of the volume content of the final structure.

Next, hot molten thermoplastic resin is introduced into the inlet nozzle 16 of the impregnation chamber. A pressure sensor 137 may sense the pressure near the impregnation die 3 to allow control to be exerted over the rate of extrusion by controlling the rotational speed of a screw shaft, or the feed rate of a feeder, providing the resin. That is, the pressure sensor 137 is positioned near the impregnation die 3, such as upstream of a manifold assembly as discussed below, so that the correct amount of resin can be delivered for interaction with the fiber rovings 142. The resin may be, for example, a thermoplastic such as PPS, PEAK, PEKK, PA12, PA6, HDPE and PA6-6, or otherwise as discussed above. The molten resin flows through the resin-conducting bores 222 in the die body 30 and partially fills the slot-like channel 4. Shortly thereafter, the roving puller 7 is activated to commence pulling the rovings 142 through the channel 4. As previously described, the undulations 252 located in the central portion of the channel 4 promote the impregnation of the rovings 142 with the molten resin by the aforementioned molten-wedging action.

The resin-impregnated rovings then exit the opening 34 in the downstream side 35 of the die body 30 and proceed to enter the sizing holes 42 of the spaced-apart faceplate 5. The tapered, frustro-conical shape of the hole 42 further impregnates the rovings 142 with resin via a shearing action. Excess resin 48 on the rovings backflows through the sizing holes 42 without pressure build-up due to the spacing-away of the faceplate 5 relative to the downstream side 35 of the die body 30. This excess resin 48 flows down the upstream side 45 of the faceplate and falls on the conveyor 27 of the recycler 25, which periodically activates to deliver the excess resin 48 to the recycler receptacle 28, which in turn is used to deliver the resin 48 back to the resin supply 15. As illustrated in FIG. 3, the sizing holes 42 extrude rod-shaped structures 50 in this example. These structures 50 are pulled through the nip of squeezing rollers 29a, 29b to form a single, continuous high fiber volume sheet 52 or tape, which may be cut into longitudinal strips or otherwise processed to form fiber reinforced tape 156. Generally speaking, the resulting tapes are relatively thin and typically have a thickness of from about 0.05 to about 1 millimeter, in some embodiments from about 0.1 to about 0.8 millimeters, and in some embodiments, from about 0.1 to about 0.4 millimeters.

Further, in some embodiments, after leaving the impregnation die 3, impregnated rovings 142, which may comprises the fiber impregnated polymer material, may enter an optional pre-shaping or guiding section (not shown) and/or a preheating device to control the temperature of the extrudate before entering the nip formed between the two adjacent rollers 29a, 29b.

The operation of the alternative embodiment of the extruder 55 is substantially the same as described with respect to the first embodiment 1, the primary difference being that during a pultrusion operation, a sheet-like roving 142 (as opposed to a string-like roving 142) is introduced into the thermoplastic pultrusion impregnation chamber 3, thus producing a resin-impregnated roving 83. This resin-impregnated roving 83 is pulled through the tapered slot 75 to form a sheet-shaped structure 85, as opposed to rod-shaped structures 50. Excess resin on the roving 83 backflows out of the slot 75 as well as out of the sides of the slot 75 via cutouts 77a, 77b and 79a, 79b without pressure build-up due to the spacing-away of the floating split faceplate 60 relative to the downstream side 35 of the die body 30. Excess resin drips downwardly onto a recycler 25 (in the same manner described with respect to the extruder 1) which periodically activates to deliver excess resin to the recycler receptacle 28, which in turn is used to deliver the resin 48 back to the resin supply 15. It should be noted that the slot 75 of the alternative embodiment 55 is easier to clean in the event of a back-up than the sizing holes 42 used in the faceplate 5 of the first embodiment 1.

FIGS. 5A and 5B are microphotographs respectively of a reinforced tape product made by the extruder of the invention across the width and length of the product, while FIGS. 6A and 6B are microphotographs at the same magnification of a reinforced tape product made by a conventional extruder across the width and length of the product. These microphotographs demonstrate that the inventive extruder 1 produces a product that is virtually indistinguishable from the same product made by a conventional prior art extruder with respect to width and length fiber distribution.

FIG. 7 is a graph comparing the volume percentage (designated "Glass Vol %") and weight percentage (designated "Ash Vol %") of glass fibers in a reinforced tape product made by a conventional prior art extruder and by the offset faceplate extruder of the invention under (a) normal resin pressure conditions (b) a 40% resin overpressure condition and (c) a 57% resin overpressure condition, respectively. In all cases, the inventive extruder 1 produced a product having a higher volume and weight percentage of reinforcing fibers. The fact that the inventive extruder could produce any product at elevated resin pressure conditions of 40% and 57% indicates that inventive extruder 1 may be reliably operated despite large pressure surges in the molten resin.

FIG. 8A is a graph comparing the range of tensile strengths of reinforced tape products made by a conventional extruder and by the extruder of the invention at a 57% resin overpressure condition, while FIG. 8B is a graph comparing the range of tensile strengths of an annealed and unannealed reinforced tape product made by a conventional extruder with a range of tensile strengths of an unannealed reinforced tape product made by the extruder of the invention at normal resin pressure conditions. Annealment maximizes crystallinity of the polymer and hence the strength of the product. The reinforced tape product made by a conventional extruder was and annealed at 400° F. for 4 hours in order to determine whether there were any significant mechanical strength differences when the product is fully crystalized.

In all cases, the product produced by the extruders 1 and 55 of the invention had the same or similar maximum tensile strength in combination with a smaller range of tensile strength variation. This data indicates that the extruder 1 of the invention produces a more uniform product than conventional extruders.

Within the impregnation die 3, it is generally desired that the rovings 142 are traversed through an impregnation zone 250 to impregnate the rovings with the polymer resin 214. The impregnation zone 250 includes and is defined by the channel 4 and undulations, surface features, 252. In the impregnation zone 250, the polymer resin may be forced generally transversely through the rovings by shear and pressure created in the impregnation zone 250, which significantly enhances the degree of impregnation. This is particularly useful when forming a composite from tapes of a high fiber content, such as about 35% weight fraction ("Wf") or more, and in some embodiments, from about 40% Wf or more. Typically, the die 3 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, pin, etc. The contact surfaces 252 are also typically made of a metal material.

As discussed, FIG. 3 shows a cross-sectional views of an impregnation die 3. As shown, the impregnation die 3 includes a manifold assembly 220, which includes a plurality of bores, or channels, 222 and an impregnation section. The impregnation section includes an impregnation zone 250. In some embodiments, the impregnation section additionally includes a gate passage 270. The manifold assembly 220 is provided for flowing the polymer resin 214 therethrough. For example, the manifold assembly 220 may include a channel 222 or a plurality of channels 222. The resin 214 provided to the impregnation die 3 may flow through the channels 222.

As shown in FIGS. 9 through 15, in exemplary embodiments, at least a portion of each of the channels 222 may be curvilinear. The curvilinear portions may allow for relatively smooth redirection of the resin 214 in various directions to distribute the resin 214 through the manifold assembly 220, and may allow for relatively smooth flow of the resin 214 through the channels 222, Alternatively, the channels 222 may be linear, and redirection of the resin 214 may be through relatively sharp transition areas between linear portions of the channels 222. It should further be understood that the channels 222 may have any suitable shape, size, and/or contour.

The plurality of channels 222 may, in exemplary embodiments as shown in FIGS. 9 through 15, be a plurality of branched runners 222. The runners 222 may include a first branched runner group 232. The first branched runner group 232 includes a plurality of runners 222 branching off from an initial channel or channels 222 that provide the resin 214 to the manifold assembly 220. The first branched runner group 232 may include 2, 3, 4 or more runners 222 branching off from the initial channels 222.

If desired, the runners 222 may include a second branched runner group 234 diverging from the first branched runner group 232, as shown in FIGS. 9 and 11 through 15. For example, a plurality of runners 222 from the second branched runner group 234 may branch off from one or more of the runners 222 in the first branched runner group 232. The second branched runner group 234 may include 2, 3, 4 or more runners 222 branching off from runners 222 in the first branched runner group 232.

If desired, the runners 222 may include a third branched runner group 236 diverging from the second branched runner group 234, as shown in FIGS. 9 and 12 through 13. For example, a plurality of runners 222 from the third branched runner group 236 may branch off from one or more of the runners 222 in the second branched runner group 234. The third branched runner group 236 may include 2, 3, 4 or more runners 222 branching off from runners 222 in the second branched runner group 234.

In some exemplary embodiments, as shown in FIGS. 9 through 15, the plurality of branched runners 222 have a symmetrical orientation along a central axis 224. The branched runners 222 and the symmetrical orientation thereof generally evenly distribute the resin 214, such that the flow of resin 214 exiting the manifold assembly 220 and coating the rovings 142 is substantially uniformly distributed on the rovings 142. This desirably allows for generally uniform impregnation of the rovings 142.

Further, the manifold assembly 220 may in some embodiments define an outlet region 242. The outlet region 242 is that portion of the manifold assembly 220 wherein resin 214 exits the manifold assembly 220. Thus, the outlet region 242 generally encompasses at least a downstream portion of the channels or runners 222 from which the resin 214 exits. In some embodiments, as shown in FIGS. 9 through 14, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142. Additionally or alternatively, various channels or runners 222 disposed in the outlet region 242 may have constant areas in the flow direction 244 of the resin 214, as shown in FIG. 15, or may have decreasing areas in the flow direction 244 of the resin 214.

In some embodiments, as shown in FIGS. 9 through 13, each of the channels or runners 222 disposed in the outlet region 242 is positioned such that resin 214 flowing therefrom is combined with resin 214 from other channels or runners 222 disposed in the outlet region 242. This combination of the resin 214 from the various channels or runners 222 disposed in the outlet region 242 produces a generally singular and uniformly distributed flow of resin 214 from the manifold assembly 220 to substantially uniformly coat the rovings 142. Alternatively, as shown in FIGS. 14 and 15, various of the channels or runners 222 disposed in the outlet region 242 may be positioned such that resin 214 flowing therefrom is discrete from the resin 214 from other channels or runners 222 disposed in the outlet region 242. In these embodiments, a plurality of discrete but generally evenly distributed resin flows 214 may be produced by the manifold assembly 220 for substantially uniformly coating the rovings 142.

As shown in FIG. 3, at least a portion of the channels or runners 222 disposed in the outlet region 242 have curvilinear cross-sectional profiles. These curvilinear profiles allow for the resin 214 to be gradually directed from the channels or runners 222 generally downward towards the rovings 142. Alternatively, however, these channels or runners 222 may have any suitable cross-sectional profiles.

As further illustrated in FIGS. 3 and 9, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough.

In some embodiments, as shown in FIG. 3, the gate passage 270 extends vertically between the manifold assembly 220 and the impregnation zone 250. Alternatively, however, the gate passage 270 may extend at any suitable angle between vertical and horizontal such that resin 214 is allowed to flow therethrough.

Further, as shown in FIG. 3, in some embodiments at least a portion of the gate passage 270 has a decreasing cross-sectional profile in the flow direction 244 of the resin 214. This taper of at least a portion of the gate passage 270 may increase the flow rate of the resin 214 flowing therethrough before it contacts the rovings 142, which may allow the resin 214 to impinge on the rovings 142. Initial impingement of the rovings 142 by the resin 214 provides for further impregnation of the rovings, as discussed below. Further, tapering of at least a portion of the gate passage 270 may increase backpressure in the gate passage 270 and the manifold assembly 220, which may further provide more even, uniform distribution of the resin 214 to coat the rovings 142. Alternatively, the gate passage 270 may have an increasing or generally constant cross-sectional profile, as desired or required.

Upon exiting the manifold assembly 220 and the gate passage 270 of the die 3 as shown in FIG. 3, the resin 214 contacts the rovings 142 being traversed through the die 3. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 provides for further impregnation of the rovings 142 with the resin 214. Impingement on the rovings 142 may be facilitated by the velocity of the resin 214 when it impacts the rovings 142, the proximity of the rovings 142 to the resin 214 when the resin exits the manifold assembly 220 or gate passage 270, or other various variables.

As shown in FIG. 3, the coated rovings 142 are traversed in run direction 282 through impregnation zone 250. The impregnation zone 250 is in fluid communication with the manifold assembly 220, such as through the gate passage 270 disposed therebetween. The impregnation zone 250 is configured to impregnate the rovings 142 with the resin 214.

For example, as discussed above, in exemplary embodiments as shown in FIGS. 3 and 16 through 22, the impregnation zone 250 includes a plurality of contact surfaces 252. The rovings 142 are traversed over the contact surfaces 252 in the impregnation zone. Impingement of the rovings 142 on the contact surface 252 creates shear and pressure sufficient to impregnate the rovings 142 with the resin 214 coating the rovings 142.

In some embodiments, as shown in FIG. 3, the impregnation zone 250 is defined between two spaced apart opposing impregnation plates 256 and 258, which may be included in the impregnation section. First plate 256 defines a first inner surface 257, while second plate 258 defines a second inner surface 259. The impregnation zone 250 is defined between the first plate 256 and the second plate 258. The contact surfaces 252 may be defined on or extend from both the first and second inner surfaces 257 and 259, or only one of the first and second inner surfaces 257 and 259.

In exemplary embodiments, as shown in FIGS. 3, 17, and 19 through 22, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

Angle 254 at which the rovings 142 traverse the contact surfaces 252 may be generally high enough to enhance shear and pressure, but not so high to cause excessive forces that will break the fibers. Thus, for example, the angle 254 may be in the range between approximately 1° and approximately 30°, and in some embodiments, between approximately 5° and approximately 25°.

As stated above, contact surfaces 252 typically possess a curvilinear surface, such as a curved lobe, pin, etc. In exemplary embodiments as shown, a plurality of peaks, which may form contact surfaces 252, and valleys are thus defined. Further, in many exemplary embodiments, the impregnation zone 250 has a waveform cross-sectional profile. In one exemplary embodiment as shown in FIGS. 3, 17, and 22, the contact surfaces 252 are lobes that form portions of the waveform surfaces of both the first and second plates 256 and 258 and define the waveform cross-sectional profile. FIG. 16 illustrates the second plate 258 and the various contact surfaces thereon that form at least a portion of the impregnation zone 250 according to some of these embodiments.

In other embodiments, as shown in FIG. 18, the contact surfaces 252 are lobes that form portions of a waveform surface of only one of the first or second plate 256 or 258. In these embodiments, impingement occurs only on the contact surfaces 252 on the surface of the one plate. The other plate may generally be flat or otherwise shaped such that no interaction with the coated rovings occurs.

In other alternative embodiments, as shown in FIGS. 19 through 21, the impregnation zone 250 may include a plurality of pins (or rods) 260, each pin having a contact surface 252. The pins 260 may be static, as shown in FIGS. 19 and 20, freely rotational (not shown), or rotationally driven, as shown in FIG. 21. Further, the pins 260 may be mounted directly to the surface of the plates defining the impingement zone, as shown in FIG. 19, or may be spaced from the surface as shown in FIGS. 20 and 21. It should be noted that the pins 260 may be heated by heaters, or may be heated individually or otherwise as desired or required. Further, the pins 260 may be contained within the die 3, or may extend outwardly from the die 3 and not be fully encased therein.

In farther alternative embodiments, the contact surfaces 252 and impregnation zone 250 may comprise any suitable shapes and/or structures for impregnating the ravings 142 with the resin 214 as desired or required.

As discussed, a roving 142 traversed through an impregnation zone 250 according to the present disclosure may become impregnated by resin 214, thus resulting in an impregnated roving 142 exiting the impregnation zone 250, such as downstream of the contact surfaces 252 in the run direction 282. The impregnated rovings 142 exiting the impregnation zone 250 are thus formed from a fiber impregnated polymer material, as discussed above. At least one fiber roving 142 may be contained within a polymer resin 214, as discussed above, to form the fiber impregnated polymer material and resulting tape 156. Further, in exemplary embodiments of the present disclosure, such tape 156 may include resin rich portions 302 and a fiber rich portion 304.

For example, as discussed above, the faceplate 5 is generally configured to meter excess resin 214 from the rovings 142. Thus, apertures in the faceplate 290, such as holes 42 or slot 75, through which the rovings 142 traverse may be sized such that when the rovings 142 are traversed therethrough, the size of the apertures causes excess resin 214 to be removed from the rovings 142. Further, traversal of impregnated rovings 142 through a faceplate 3 may facilitate the formation of first and second resin rich portions 302. For example, as the impregnated rovings 142 are traversed through apertures in the faceplate 3, the resin 214 surrounding each roving 142 may be generally evenly distributed around each roving 142. When the rovings 142 are then consolidated into a tape 156, as discussed above, the evenly distributed resin 214 surrounding the rovings 142 may become the first and second resin rich portions 302. A fiber rich portion 304 may be disposed between the resin rich portions 302.

FIGS. 26 and 27 illustrate embodiments of a tape 156 having opposing resin rich portions 302 according to the present disclosure. The tape 156 may have a first outer surface 312 and a second opposing outer surface 314. As discussed, such tape 156 may include a first resin rich portion 302, a second resin rich portion 302, and a fiber rich portion 304 disposed between the resin rich portions 302. In some embodiments, the tape 156 consists solely of the resin rich portions 302 and fiber rich portion 304. The first outer surface 312 may include the first resin rich portion 302, and the second outer surface 314 may include the second resin rich portion 302. The fiber rich portion 304 may be disposed between the resin rich portions 304 and thus between the first and second outer surfaces 312, 314.

The various portions of the tape 156 may in some embodiments be defined as respective thirds of a tape 156, such as when viewed as a cross-section. For example, each resin rich portion 302 may include that portion of the tape 156 within one-third of a height 306 throughout all of a width 308. In other embodiments, the resin rich portions 302 and fiber rich portion 304 may be viewed as more or less than a third of a tape 156 as discussed above. For example, a resin rich portion 302 may be less than third of the tape 156, such as less than or equal to approximately 5%, 10%, 20%, or 30% of the height 306 throughout the width 308. A fiber rich portion 302 may be greater than or equal to approximately 95%, 90%, 80%, 70%, 60%, 50%, or 40% of the height 306 throughout the width 308.

A resin rich portion 302 according to the present disclosure may include relatively more resin 214 than fibers 300, while a fiber rich portion 304 may include relatively more fibers 300 than resin 214. In some embodiments, such ratio may be calculated on a per volume basis for a tape 156, or on a per surface area basis for a cross-section of a tape 156. In these embodiments, such ratio may further be calculated as an average throughout all or a portion of a tape 156, such as throughout all or a portion of the length of a tape 156 using the volume thereof or using a plurality of cross-sections.

For example, a resin rich portion 302 in some embodiments may include at least approximately 60%, 65%, 70%, 75%, 80%, 85%, or any other suitable percentage, range, or sub-range thereof of the total amount of resin 214. The total amount may include the amount in both the resin rich portions 302 and the fiber rich portion 304. In other embodiments, the ratio of resin 214 to fibers 300 in the resin rich portion 302 may be at least approximately 1.2 to 1, 1.6 to 1, 2 to 1, 2.4 to 1, 2.8 to 1, 3.2 to 1, 3.6 to 1, 4.0 to 1, or any other suitable ratio, range, or sub-range thereof. As discussed above, the total amount or ratio may be calculated on a per volume basis or a per surface area basis for a cross-sectional area of a tape 156.

Further, the fiber rich portion 304 in some embodiments may include at least approximately 60%, 65%, 70%, 75%, 80%, 85%, or any other suitable percentage, range, or sub-range thereof of the total amount of fiber 300. The total amount may include the amount in both the resin rich portions 302 and the fiber rich portion 304. In other embodiments, the ratio of fiber 300 to resin 214 in the fiber rich portion 304 may be at least approximately 1.2 to 1, 1.6 to 1, 2 to 1, 2.4 to 1, 2.8 to 1, 3.2 to 1, 3.6 to 1, 4.0 to 1, or any other suitable ratio, range, or sub-range thereof. As discussed above, the total amount or ratio may be calculated on a per volume basis or a per surface area basis for a cross-sectional area of a tape 156.

Additionally or alternatively, a resin rich portion 302 in some embodiments may include a percentage resin 214 (as opposed to fibers 300 contained in the resin rich portion 302) of at least approximately 75%, 80%, 85%, 90%, 95%, 100% or any other suitable percentage, range, or sub-range thereof. Such percentage may be calculated on a per volume basis or a per surface area basis for a cross-sectional area of a tape 156.

Microscopy may in some embodiments be particularly useful in determining the existence of resin rich portions 302 and fiber rich portions 304. A microscopy image of one embodiment of a tape 156 having opposing resin rich portions 302 and a fiber rich portion 304 is shown in FIG. 27. A cross-section of a tape 156 can be analyzed using microscopy to determine the existence of resin rich portions 302 and a fiber rich portion 304. Such method is particularly useful in embodiments wherein a resin rich portion 302 is less than half or a third of the tape 156, such as less than or equal to approximately 5%, 10%, 20% of the height 306, and further is relatively devoid of fibers 300, such as containing a percentage resin 214 (as opposed to fibers 300 contained in the resin rich portion 302) of at least approximately 75%, 80%, 85%, 90%, 95%, or 100%.

It should be understood that a tape 156 according to the present disclosure may have any suitable cross-sectional shape and/or size. For example, such tape 156 may have a generally rectangular shape, or a generally oval or circular or other suitable polygonal or otherwise shape. Further, it should be understood that one or more impregnated rovings 142 having been traversed through the impregnation zone 250 may together form the tape 156, with the resin 214 of the various ravings 142 connected to form such tape 156. The various above amounts, ranges, and/or ratios may thus in exemplary embodiments be determined for a tape 156 having any suitable number of impregnated ravings 142 embedded and generally dispersed within resin 214.

To further facilitate impregnation of the rovings 142, they may also be kept under tension while present within the die 3, and specifically within the impregnation zone 250. The tension may, for example, range from about 5 to about 300 Newtons, in some embodiments from about 50 to about 250 Newtons, and in some embodiments, from about 100 to about 200 Newtons per roving 142 or tow of fibers.

As shown in FIGS. 3, 23 and 24, in some embodiments, a land zone 280 may be positioned downstream of the impregnation zone 250 in run direction 282 of the rovings 142. The rovings 142 may traverse through the land zone 280 before exiting the die 3. In some embodiments, as shown in FIG. 23, at least a portion of the land zone 280 may have an increasing cross-sectional profile in run direction 282, such that the area of the land zone 280 increases. The increasing portion may be the downstream portion of the land zone 280 to facilitate the rovings 142 exiting the die 3. Alternatively, the cross-sectional profile or any portion thereof may decrease, or may remain constant as shown in FIG. 24.

Additionally, other components may be optionally employed to assist in the impregnation of the fibers. For example, a "gas jet" assembly may be employed in certain embodiments to help uniformly spread a roving of individual fibers, which may each contain up to as many as 24,000 fibers, across the entire width of the merged tow. This helps achieve uniform distribution of strength properties. Such an assembly may include a supply of compressed air or another gas that impinges in a generally perpendicular fashion on the moving rovings that pass across exit ports. The spread rovings may then be introduced into a die for impregnation, such as described above.

The tapes 156 that result from use of the die and method according to the present disclosure may have a very low void fraction, which helps enhance their strength. For instance, the void fraction may be about 3% or less, in some embodiments about 2% or less, in some embodiments about 1.5% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the polymer matrix, which may then be used to calculate the "void fraction" based on the following equations:

$$V_f = 100 * (\rho_t - \rho_c)/\rho_t$$

where, $V_f$ is the void fraction as a percentage;
$\rho_c$ is the density of the composite as measured using known techniques, such as with a liquid or gas pycnometer (e.g., helium pycnometer);
$\rho_t$ is the theoretical density of the composite as is determined by the following equation:

$$\rho_t = 1/[W_f/\rho_f + W_m/\rho_m]$$

$\rho_m$ is the density of the polymer matrix (e.g., at the appropriate crystallinity);
$\rho_f$ is the density of the fibers;
$W_f$ is the weight fraction of the fibers; and
$W_m$ is the weight fraction of the polymer matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the polymer, fibers, and tape in accordance with ASTM D 2734-09 (Method A), where the densities may be determined ASTM D792-08 Method A. Of course, the void fraction can also be estimated using conventional microscopy equipment.

As discussed above, after exiting the impregnation die. 3, the impregnated rovings 142 may be consolidated into a consolidated tape 156. The number of rovings employed in each tape 156 may vary. Typically, however, a tape 156 will contain from 2 to 80 rovings, and in some embodiments from 10 to 60 rovings, and in some embodiments, from 20 to 50 rovings. In some embodiments, it may be desired that the rovings are spaced apart approximately the same distance from each other within the tape 156. In other embodiments, however, it may be desired that the rovings are combined, such that the fibers of the rovings are generally evenly distributed throughout the tape 156, such as throughout resin rich portions and a fiber rich portion as discussed above. In these embodiments, the rovings may be generally indistinguishable from each other. Referring to FIGS. 25 through 27, for example, embodiments of a tape 156 are shown that contains rovings that are combined such that the fibers are generally evenly distributed within a fiber rich portion thereof. FIGS. 26 and 27 show embodiments of a tape 156 having opposing resin rich portions 302 and a fiber rich portion 304 disposed therebetween.

A relatively high percentage of fibers may be employed in a tape, and fiber reinforced thermoplastic material thereof, to provide enhanced strength properties. For instance, fibers typically constitute from about 25 wt. % to about 90 wt. %, in some embodiments from about 30 wt. % to about 75 wt. %, and in some embodiments, from about 35 wt. % to about 70 wt. % of the tape or material thereof. Likewise, polymer(s) typically constitute from about 20 wt. % to about 75 wt. %, in some embodiments from about 25 wt. % to about 70 wt. %, and in some embodiments, from about 30 wt. % to about 65 wt. % of the tape 156. Such percentage of fibers may additionally or alternatively by measured as a volume fraction. For example, in some embodiments, the fiber reinforced thermoplastic material may have a fiber volume fraction between approximately 25% and approximately 80%, in some embodiments between approximately 30% and approximately 70%, in some embodiments between approximately 40% and approximately 60%, and in some embodiments between approximately 45% and approximately 55%.

Tapes 156 formed according to the present disclosure have a variety of advantageous characteristics. Notably, the resin rich portions allows more efficient and stronger bonding with other components, such as pipes, etc., thus providing improved reinforcement of these components. Because these portions are resin rich, the resin may be relatively more efficiently heated to a temperature that allows consolidation and bonding with another component, which provides more rapid and thorough bonding thereof. Better bonding generally provides improved strength, etc., for the resulting component. The fiber rich portion between the resin rich portions may advantageously strengthen and reinforce the tape. This further provides improved strength, etc., for resulting components to which the tape may be bonded. Further, oxidation of various additives included in a fiber reinforced thermoplastic material formed according to the present disclosure may be advantageously identified due to discoloration of the resin rich portions or fiber rich portion. Such identification may allow for removal of these portions of the material.

While the invention has been described in detail with particular reference to certain preferred embodiments thereof, it will be understood that variations and modifications can be effected within the spirit and scope of the invention, which is limited only by the appended claims and equivalents thereof.

What is claimed is:

1. A tape comprising a thermoplastic resin and a plurality of generally unidirectional continuous fibers embedded in the thermoplastic resin to form a single layer of fiber reinforced thermoplastic material, wherein the fibers are disposed in the single layer of fiber reinforced thermoplastic material to form a first resin rich portion, a second resin rich portion, and a fiber rich portion disposed between the first resin rich portion and the second resin rich portion, the first resin rich portion defining a first outer surface of the fiber reinforced thermoplastic material and the second resin rich portion defining an opposing second outer surface of the fiber reinforced thermoplastic material, the first resin rich portion, the second resin rich portion, and the fiber rich portion each including the identical thermoplastic resin which defines and extends between the first outer surface and the opposing second outer surface, wherein the first resin rich portion and second resin rich portion are each between 5% and one-third of a height of the tape and each comprises at least 75% thermoplastic resin by volume, and wherein the tape having the fiber reinforced thermoplastic material has a void fraction of approximately 3% or less, the tape formed by a process comprising:
    flowing a thermoplastic resin through a manifold assembly of a die, the manifold assembly comprising a plurality of branched runners;
    coating at least one fiber roving with the resin;
    traversing the coated roving through an impregnation zone of the die to impregnate the roving with the resin; and
    drawing the impregnated roving through a faceplate spaced apart from a downstream side of the die.

2. The tape of claim 1, further comprising rolling the impregnated roving through a roller.

3. The tape of claim 1, wherein the first resin rich portion and second resin rich portion each comprises at least 95% resin by volume.

4. The tape of claim 1, wherein the fiber reinforced thermoplastic material has a fiber volume fraction of between approximately 40% and approximately 60%.

5. The tape of claim 1, wherein the fiber reinforced thermoplastic material has a void fraction of approximately 2% or less.

6. The tape of claim 1, wherein the tape has a generally rectangular cross-section.

7. The tape of claim 1, wherein the fibers are generally unidirectional continuous fibers.

8. The tape of claim 1, wherein the first resin rich portion and second resin rich portion are each one-third of the height of the tape.

9. A tape comprising a thermoplastic resin and a plurality of generally unidirectional continuous fibers embedded in the thermoplastic resin to form a single layer of fiber reinforced thermoplastic material, wherein the fibers are disposed in the single layer of fiber reinforced thermoplastic material to form a first resin rich portion, a second resin rich portion, and a fiber rich portion disposed between the first resin rich portion and the second resin rich portion, the first resin rich portion defining a first outer surface of the fiber reinforced thermoplastic material and the second resin rich portion defining an opposing second outer surface of the fiber reinforced thermoplastic material, the first resin rich portion, the second resin rich portion, and the fiber rich portion each including the identical thermoplastic resin which defines and extends between the first outer surface and the opposing second outer surface, wherein the first resin rich portion and second resin rich portion are each between 5% and one-third of a height of the tape and each comprises at least 75% thermoplastic resin, and wherein the tape having the fiber reinforced thermoplastic material has a void fraction of approximately 3% or less.

10. The tape of claim 9, wherein the first resin rich portion and second resin rich portion each comprises at least 95% resin by volume.

11. The tape of claim 9, wherein the fiber reinforced thermoplastic material has a fiber volume fraction of between approximately 40% and approximately 60%.

12. The tape of claim 9, wherein the tape has a generally rectangular cross-section.

13. The tape of claim 9, wherein the first resin rich portion and second resin rich portion are each one-third of the height of the tape.

14. A tape comprising a thermoplastic resin and a plurality of generally unidirectional continuous fibers embedded in the thermoplastic resin to form a single layer of fiber reinforced thermoplastic material, wherein the fibers are disposed in the single layer of fiber reinforced thermoplastic material to form a first resin rich portion, a second resin rich portion, and a fiber rich portion disposed between the first resin rich portion and the second resin rich portion, the first resin rich portion defining a first outer surface of the fiber reinforced thermoplastic material and the second resin rich portion defining an opposing second outer surface of the fiber reinforced thermoplastic material, wherein the first resin rich portion and second resin rich portion are each between 5% and one-third of a height of the tape and each comprises at least 75% thermoplastic resin, wherein the tape having the fiber reinforced thermoplastic material has a void fraction of approximately 3% or less, wherein the thermoplastic resin comprises between 30 wt. % and 75 wt. % of the tape, and wherein the thermoplastic resin defines and extends between the first outer surface and the opposing second outer surface.

15. The tape of claim 14, wherein the first resin rich portion and second resin rich portion each comprises at least 95% resin by volume.

16. The tape of claim 14, wherein the fiber reinforced thermoplastic material has a fiber volume fraction of between approximately 40% and approximately 60%.

17. The tape of claim 14, wherein the tape has a generally rectangular cross-section.

18. The tape of claim 14, wherein the first resin rich portion and second resin rich portion are each one-third of the height of the tape.

* * * * *